US008350971B2

(12) United States Patent  
Malone et al.

(10) Patent No.: US 8,350,971 B2  
(45) Date of Patent: Jan. 8, 2013

(54) SYSTEMS AND METHODS FOR CONTROLLING MEDIA DEVICES

(75) Inventors: Edward D. Malone, Pleasanton, CA (US); George E. Williams, Oakland, CA (US); Matthew A. Feinstein, Palo Alto, CA (US); Anant Madhava Kulkarni, Bangalore (IN); Jagadish Dande, Kurnool (IN)

(73) Assignee: Sling Media, Inc., Foster City, CA (US)

( * ) Notice: Subject to any disclaimer, the term of this patent is extended or adjusted under 35 U.S.C. 154(b) by 1010 days.

(21) Appl. No.: 12/256,344

(22) Filed: Oct. 22, 2008

(65) Prior Publication Data  
US 2009/0102983 A1 Apr. 23, 2009

Related U.S. Application Data

(60) Provisional application No. 60/981,993, filed on Oct. 23, 2007.

(51) Int. Cl.  
*H04N 5/44* (2006.01)  
*H04N 5/445* (2006.01)  
*H04N 7/173* (2006.01)  
*G06F 15/16* (2006.01)

(52) U.S. Cl. ........ 348/734; 348/564; 709/231; 725/105; 725/90

(58) Field of Classification Search .................. None  
See application file for complete search history.

(56) References Cited

U.S. PATENT DOCUMENTS

| 3,416,043 A | 12/1968 | Jorgensen |
| 4,254,303 A | 3/1981 | Takizawa |
| 5,161,021 A | 11/1992 | Tsai |
| 5,237,648 A | 8/1993 | Mills et al. |
| 5,386,493 A | 1/1995 | Degen et al. |
| 5,434,590 A | 7/1995 | Dinwiddie, Jr. et al. |
| 5,493,638 A | 2/1996 | Hooper et al. |
| 5,602,589 A | 2/1997 | Vishwanath et al. |
| 5,661,516 A | 8/1997 | Carles |
| 5,666,426 A | 9/1997 | Helms |
| 5,682,195 A | 10/1997 | Hendricks et al. |

(Continued)

FOREIGN PATENT DOCUMENTS

CN 1464685 12/2003

(Continued)

OTHER PUBLICATIONS

USPTO, Final Office Action, mailed Nov. 6, 2009; U.S. Appl. No. 09/809,868, filed Mar. 15, 2001.

(Continued)

*Primary Examiner* — Jefferey Harold  
*Assistant Examiner* — Sean Haiem  
(74) *Attorney, Agent, or Firm* — Ingrassia Fisher & Lorenz, P.C.

(57) ABSTRACT

Systems and methods process an input received from a remote control. A media stream is presented on a display, and the input from the remote control is received at a local device associated with the display. The local device may determine if the input is intended for the local device or a remote device. If the input is intended for the local device, the input may be processed at the local device. Various interface features, for example, may be managed at the local device. If the input is intended for the remote device, a signal may be transmitted from the local device to the remote device to thereby allow the remote device to respond to the input.

20 Claims, 9 Drawing Sheets

U.S. PATENT DOCUMENTS

| | | |
|---|---|---|
| 5,706,290 A | 1/1998 | Shaw et al. |
| 5,708,961 A | 1/1998 | Hylton et al. |
| 5,710,605 A | 1/1998 | Nelson |
| 5,722,041 A | 2/1998 | Freadman |
| 5,757,416 A | 5/1998 | Birch et al. |
| 5,774,170 A | 6/1998 | Hite et al. |
| 5,778,077 A | 7/1998 | Davidson |
| 5,794,116 A | 8/1998 | Matsuda et al. |
| 5,822,537 A | 10/1998 | Katseff et al. |
| 5,831,664 A | 11/1998 | Wharton et al. |
| 5,850,482 A | 12/1998 | Meany et al. |
| 5,852,437 A | 12/1998 | Wugofski et al. |
| 5,880,721 A | 3/1999 | Yen |
| 5,898,679 A | 4/1999 | Brederveld et al. |
| 5,909,518 A | 6/1999 | Chui |
| 5,911,582 A | 6/1999 | Redford et al. |
| 5,922,072 A | 7/1999 | Hutchinson et al. |
| 5,936,968 A | 8/1999 | Lyons |
| 5,968,132 A | 10/1999 | Tokunaga |
| 5,987,501 A | 11/1999 | Hamilton et al. |
| 6,002,450 A | 12/1999 | Darbee et al. |
| 6,008,777 A | 12/1999 | Yiu |
| 6,014,694 A | 1/2000 | Aharoni et al. |
| 6,020,880 A | 2/2000 | Naimpally |
| 6,031,940 A | 2/2000 | Chui et al. |
| 6,036,601 A | 3/2000 | Heckel |
| 6,040,829 A | 3/2000 | Croy et al. |
| 6,043,837 A | 3/2000 | Driscoll, Jr. et al. |
| 6,049,671 A | 4/2000 | Slivka et al. |
| 6,075,906 A | 6/2000 | Fenwick et al. |
| 6,088,777 A | 7/2000 | Sorber |
| 6,097,441 A | 8/2000 | Allport |
| 6,104,334 A | 8/2000 | Allport |
| 6,108,041 A | 8/2000 | Faroudja et al. |
| 6,115,420 A | 9/2000 | Wang |
| 6,117,126 A | 9/2000 | Appelbaum et al. |
| 6,141,059 A | 10/2000 | Boyce et al. |
| 6,141,447 A | 10/2000 | Linzer et al. |
| 6,160,544 A | 12/2000 | Hayashi et al. |
| 6,201,536 B1 | 3/2001 | Hendricks et al. |
| 6,212,282 B1 | 4/2001 | Mershon |
| 6,222,885 B1 | 4/2001 | Chaddha et al. |
| 6,223,211 B1 | 4/2001 | Hamilton et al. |
| 6,240,459 B1 | 5/2001 | Roberts et al. |
| 6,240,531 B1 | 5/2001 | Spilo et al. |
| 6,243,596 B1 | 6/2001 | Kikinis |
| 6,256,019 B1 | 7/2001 | Allport |
| 6,263,503 B1 | 7/2001 | Margulis |
| 6,279,029 B1 | 8/2001 | Sampat et al. |
| 6,282,714 B1 | 8/2001 | Ghori et al. |
| 6,286,142 B1 | 9/2001 | Ehreth |
| 6,310,886 B1 | 10/2001 | Barton |
| 6,340,994 B1 | 1/2002 | Margulis et al. |
| 6,353,885 B1 | 3/2002 | Herzi et al. |
| 6,356,945 B1 | 3/2002 | Shaw et al. |
| 6,357,021 B1 | 3/2002 | Kitagawa et al. |
| 6,370,688 B1 | 4/2002 | Hejna, Jr. |
| 6,389,467 B1 | 5/2002 | Eyal |
| 6,434,113 B1 | 8/2002 | Gubbi |
| 6,442,067 B1 | 8/2002 | Chawla et al. |
| 6,456,340 B1 | 9/2002 | Margulis |
| 6,466,623 B1 | 10/2002 | Youn et al. |
| 6,470,378 B1 | 10/2002 | Tracton et al. |
| 6,476,826 B1 | 11/2002 | Plotkin et al. |
| 6,487,319 B1 | 11/2002 | Chai |
| 6,493,874 B2 | 12/2002 | Humpleman |
| 6,496,122 B2 | 12/2002 | Sampsell |
| 6,505,169 B1 | 1/2003 | Bhagavath et al. |
| 6,510,177 B1 | 1/2003 | De Bonet et al. |
| 6,529,506 B1 | 3/2003 | Yamamoto et al. |
| 6,553,147 B2 | 4/2003 | Chai et al. |
| 6,557,031 B1 | 4/2003 | Mimura et al. |
| 6,564,004 B1 | 5/2003 | Kadono |
| 6,567,984 B1 | 5/2003 | Allport |
| 6,584,201 B1 | 6/2003 | Konstantinou et al. |
| 6,584,559 B1 | 6/2003 | Huh et al. |
| 6,597,375 B1 | 7/2003 | Yawtiz |
| 6,598,159 B1 | 7/2003 | McAlister et al. |
| 6,600,838 B2 | 7/2003 | Chui |
| 6,609,253 B1 | 8/2003 | Swix et al. |
| 6,611,530 B1 | 8/2003 | Apostolopoulos |
| 6,628,716 B1 | 9/2003 | Tan et al. |
| 6,642,939 B1 | 11/2003 | Vallone et al. |
| 6,647,015 B2 | 11/2003 | Malkemes et al. |
| 6,658,019 B1 | 12/2003 | Chen et al. |
| 6,665,751 B1 | 12/2003 | Chen et al. |
| 6,665,813 B1 | 12/2003 | Forsman et al. |
| 6,697,356 B1 | 2/2004 | Kretschmer et al. |
| 6,701,380 B2 | 3/2004 | Schneider et al. |
| 6,704,678 B2 | 3/2004 | Minke et al. |
| 6,704,847 B1 | 3/2004 | Six et al. |
| 6,708,231 B1 | 3/2004 | Kitagawa |
| 6,718,551 B1 | 4/2004 | Swix et al. |
| 6,754,266 B2 | 6/2004 | Bahl et al. |
| 6,754,439 B1 | 6/2004 | Hensley et al. |
| 6,757,851 B1 | 6/2004 | Park et al. |
| 6,757,906 B1 | 6/2004 | Look et al. |
| 6,766,376 B2 | 7/2004 | Price |
| 6,768,775 B1 | 7/2004 | Wen et al. |
| 6,771,828 B1 | 8/2004 | Malvar |
| 6,774,912 B1 | 8/2004 | Ahmed et al. |
| 6,781,601 B2 | 8/2004 | Cheung |
| 6,785,700 B2 | 8/2004 | Masud et al. |
| 6,795,638 B1 | 9/2004 | Skelley, Jr. |
| 6,798,838 B1 | 9/2004 | Ngo |
| 6,806,909 B1 | 10/2004 | Radha et al. |
| 6,807,308 B2 | 10/2004 | Chui et al. |
| 6,816,194 B2 | 11/2004 | Zhang et al. |
| 6,816,858 B1 | 11/2004 | Coden et al. |
| 6,826,242 B2 | 11/2004 | Ojard et al. |
| 6,834,123 B2 | 12/2004 | Acharya et al. |
| 6,839,079 B2 | 1/2005 | Barlow et al. |
| 6,847,468 B2 | 1/2005 | Ferriere |
| 6,850,571 B2 | 2/2005 | Tardif |
| 6,850,649 B1 | 2/2005 | Malvar |
| 6,868,083 B2 | 3/2005 | Apostolopoulos et al. |
| 6,889,385 B1 | 5/2005 | Rakib et al. |
| 6,892,359 B1 | 5/2005 | Nason et al. |
| 6,898,583 B1 | 5/2005 | Rising, III |
| 6,907,602 B2 | 6/2005 | Tsai et al. |
| 6,927,685 B2 | 8/2005 | Wathen |
| 6,930,661 B2 | 8/2005 | Uchida et al. |
| 6,941,575 B2 | 9/2005 | Allen |
| 6,944,880 B1 | 9/2005 | Allen |
| 6,952,595 B2 | 10/2005 | Ikedo et al. |
| 6,981,050 B1 | 12/2005 | Tobias et al. |
| 7,016,337 B1 | 3/2006 | Wu et al. |
| 7,020,892 B2 | 3/2006 | Levesque et al. |
| 7,032,000 B2 | 4/2006 | Tripp |
| 7,047,305 B1 | 5/2006 | Brooks et al. |
| 7,110,558 B1 | 9/2006 | Elliott |
| 7,124,366 B2 | 10/2006 | Foreman et al. |
| 7,151,575 B1 | 12/2006 | Landry et al. |
| 7,155,734 B1 | 12/2006 | Shimomura et al. |
| 7,155,735 B1 | 12/2006 | Ngo et al. |
| 7,184,433 B1 | 2/2007 | Oz |
| 7,224,323 B2 | 5/2007 | Uchida et al. |
| 7,239,800 B2 | 7/2007 | Bilbrey |
| 7,344,084 B2 | 3/2008 | DaCosta |
| 7,430,686 B1 | 9/2008 | Wang et al. |
| 7,464,396 B2 | 12/2008 | Hejna, Jr. |
| 7,502,733 B2 | 3/2009 | Andrsen et al. |
| 7,505,480 B1 | 3/2009 | Zhang et al. |
| 7,565,681 B2 | 7/2009 | Ngo et al. |
| 2001/0021998 A1 | 9/2001 | Margulis |
| 2002/0004839 A1 | 1/2002 | Wine et al. |
| 2002/0010925 A1 | 1/2002 | Kikinis |
| 2002/0012530 A1 | 1/2002 | Bruls |
| 2002/0031333 A1 | 3/2002 | Mano et al. |
| 2002/0046404 A1 | 4/2002 | Mizutani |
| 2002/0053053 A1 | 5/2002 | Nagai et al. |
| 2002/0080753 A1 | 6/2002 | Lee |
| 2002/0090029 A1 | 7/2002 | Kim |
| 2002/0105529 A1 | 8/2002 | Bowser et al. |
| 2002/0112247 A1 | 8/2002 | Horner et al. |
| 2002/0122137 A1 | 9/2002 | Chen et al. |
| 2002/0131497 A1 | 9/2002 | Jang |

| | | |
|---|---|---|
| 2002/0138843 A1 | 9/2002 | Samaan et al. |
| 2002/0143973 A1 | 10/2002 | Price |
| 2002/0147634 A1 | 10/2002 | Jacoby et al. |
| 2002/0147687 A1 | 10/2002 | Breiter et al. |
| 2002/0167458 A1 | 11/2002 | Baudisch et al. |
| 2002/0188818 A1 | 12/2002 | Nimura et al. |
| 2002/0191575 A1 | 12/2002 | Kalavade et al. |
| 2003/0001880 A1 | 1/2003 | Holtz et al. |
| 2003/0028873 A1 | 2/2003 | Lemmons |
| 2003/0065915 A1 | 4/2003 | Yu et al. |
| 2003/0093260 A1 | 5/2003 | Dagtas et al. |
| 2003/0095791 A1 | 5/2003 | Barton et al. |
| 2003/0115167 A1 | 6/2003 | Sharif et al. |
| 2003/0159143 A1 | 8/2003 | Chan |
| 2003/0187657 A1 | 10/2003 | Erhart et al. |
| 2003/0192054 A1 | 10/2003 | Birks et al. |
| 2003/0200548 A1* | 10/2003 | Baran et al. ............ 725/90 |
| 2003/0208612 A1 | 11/2003 | Harris et al. |
| 2003/0231621 A1 | 12/2003 | Gubbi et al. |
| 2004/0003406 A1 | 1/2004 | Billmaier |
| 2004/0052216 A1 | 3/2004 | Roh |
| 2004/0068334 A1 | 4/2004 | Tsai et al. |
| 2004/0083301 A1 | 4/2004 | Murase et al. |
| 2004/0100486 A1 | 5/2004 | Flamini et al. |
| 2004/0103340 A1 | 5/2004 | Sundareson et al. |
| 2004/0139047 A1 | 7/2004 | Rechsteiner et al. |
| 2004/0162845 A1 | 8/2004 | Kim et al. |
| 2004/0162903 A1 | 8/2004 | Oh |
| 2004/0172410 A1 | 9/2004 | Shimojima et al. |
| 2004/0205830 A1 | 10/2004 | Kaneko |
| 2004/0212640 A1 | 10/2004 | Mann et al. |
| 2004/0216173 A1 | 10/2004 | Horoszowski et al. |
| 2004/0236844 A1 | 11/2004 | Kocherlakota |
| 2004/0255249 A1 | 12/2004 | Chang et al. |
| 2005/0021398 A1 | 1/2005 | McCleskey et al. |
| 2005/0027821 A1 | 2/2005 | Alexander et al. |
| 2005/0038981 A1 | 2/2005 | Connor et al. |
| 2005/0044058 A1 | 2/2005 | Matthews et al. |
| 2005/0050462 A1 | 3/2005 | Whittle et al. |
| 2005/0053356 A1 | 3/2005 | Mate et al. |
| 2005/0055595 A1 | 3/2005 | Frazer et al. |
| 2005/0060759 A1 | 3/2005 | Rowe et al. |
| 2005/0097542 A1 | 5/2005 | Lee |
| 2005/0114852 A1 | 5/2005 | Chen et al. |
| 2005/0132351 A1 | 6/2005 | Randall et al. |
| 2005/0138560 A1 | 6/2005 | Lee et al. |
| 2005/0198584 A1 | 9/2005 | Matthews et al. |
| 2005/0204046 A1 | 9/2005 | Watanabe |
| 2005/0216851 A1 | 9/2005 | Hull et al. |
| 2005/0227621 A1 | 10/2005 | Katoh |
| 2005/0229118 A1 | 10/2005 | Chiu et al. |
| 2005/0246369 A1 | 11/2005 | Oreizy et al. |
| 2005/0251833 A1 | 11/2005 | Schedivy |
| 2005/0283791 A1 | 12/2005 | McCarthy et al. |
| 2005/0288999 A1 | 12/2005 | Lerner et al. |
| 2006/0011371 A1 | 1/2006 | Fahey |
| 2006/0031381 A1 | 2/2006 | Van Luijt et al. |
| 2006/0050970 A1 | 3/2006 | Gunatilake |
| 2006/0051055 A1 | 3/2006 | Ohkawa |
| 2006/0095401 A1 | 5/2006 | Krikorian et al. |
| 2006/0095471 A1* | 5/2006 | Krikorian et al. ....... 707/104.1 |
| 2006/0095472 A1 | 5/2006 | Krikorian et al. |
| 2006/0095942 A1 | 5/2006 | Van Beek |
| 2006/0095943 A1 | 5/2006 | Demircin et al. |
| 2006/0107226 A1 | 5/2006 | Matthews et al. |
| 2006/0117371 A1 | 6/2006 | Margulis |
| 2006/0146174 A1 | 7/2006 | Hagino |
| 2006/0280157 A1 | 12/2006 | Karaoguz et al. |
| 2007/0003224 A1 | 1/2007 | Krikorian et al. |
| 2007/0005783 A1 | 1/2007 | Saint-Hillaire et al. |
| 2007/0022328 A1 | 1/2007 | Tarra et al. |
| 2007/0074115 A1 | 3/2007 | Patten et al. |
| 2007/0076604 A1 | 4/2007 | Litwack |
| 2007/0168543 A1 | 7/2007 | Krikorian et al. |
| 2007/0180485 A1 | 8/2007 | Dua |
| 2007/0198532 A1 | 8/2007 | Krikorian et al. |
| 2007/0234213 A1 | 10/2007 | Krikorian et al. |
| 2007/0286596 A1 | 12/2007 | Lonn |
| 2008/0019276 A1 | 1/2008 | Takatsuji et al. |
| 2008/0037573 A1 | 2/2008 | Cohen |
| 2008/0059533 A1 | 3/2008 | Krikorian |
| 2008/0134267 A1 | 6/2008 | Moghe et al. |
| 2008/0195744 A1* | 8/2008 | Bowra et al. ............ 709/231 |
| 2008/0199150 A1 | 8/2008 | Candelore |
| 2008/0294759 A1 | 11/2008 | Biswas et al. |
| 2008/0307456 A1 | 12/2008 | Beetcher et al. |
| 2008/0307462 A1 | 12/2008 | Beetcher et al. |
| 2008/0307463 A1 | 12/2008 | Beetcher et al. |
| 2009/0031375 A1* | 1/2009 | Sullivan et al. ......... 725/105 |
| 2009/0074380 A1 | 3/2009 | Boston et al. |
| 2009/0199248 A1 | 8/2009 | Ngo et al. |
| 2010/0100915 A1 | 4/2010 | Krikorian et al. |
| 2011/0090402 A1* | 4/2011 | Huntington et al. ..... 348/564 |

FOREIGN PATENT DOCUMENTS

| | | |
|---|---|---|
| DE | 4407319 A1 | 9/1994 |
| EP | 0838945 A | 4/1998 |
| EP | 1077407 A1 | 2/2001 |
| EP | 1443766 A2 | 8/2004 |
| EP | 1691550 A | 8/2006 |
| EP | 1830558 A1 | 9/2007 |
| GB | 2307151 A | 5/1997 |
| KR | 19990082855 A | 11/1999 |
| KR | 20010211410 A | 8/2001 |
| WO | 0133839 A1 | 5/2001 |
| WO | 0147248 A2 | 6/2001 |
| WO | 0193161 A1 | 12/2001 |
| WO | 03026232 A1 | 3/2003 |
| WO | 03052552 A2 | 6/2003 |
| WO | 03098897 A | 11/2003 |
| WO | 2004032511 A1 | 4/2004 |
| WO | 2005050898 A2 | 6/2005 |
| WO | 2006064454 A1 | 6/2006 |
| WO | 20060074110 A | 7/2006 |
| WO | 2007027891 A2 | 3/2007 |
| WO | 2007051156 A2 | 5/2007 |
| WO | 2007141555 A2 | 12/2007 |
| WO | 2007149466 A2 | 12/2007 |
| WO | 2008024723 A | 2/2008 |

OTHER PUBLICATIONS

USPTO, Final Office Action mailed Nov. 12, 2009; U.S. Appl. No. 11/620,707, filed Jan. 7, 2007.
USPTO, Non-Final Office Action mailed Nov. 23, 2009; U.S. Appl. No. 11/683,862, filed Mar. 8, 2007.
USPTO, Non-Final Office Action mailed Oct. 1, 2009; U.S. Appl. No. 11/778,287, filed Jul. 16, 2007.
USPTO Final Office Action mailed Dec. 30, 2009; U.S. Appl. No. 11/147,664, filed Jun. 7, 2005.
European Patent Office, European Search Report, mailed Sep. 28, 2009 for European Application No. EP 06 78 6175.
International Search Report for PCT/US2008/069914 mailed Dec. 19, 2008.
PCT Partial International Search, PCT/US2009/054893, mailed Dec. 23, 2009.
Newton's Telecom Dictionary, 21st ed., Mar. 2005.
Ditze M. et all "Resource Adaptation for Audio-Visual Devices in the UPnP QoS Architecture," Advanced Networking and Applications, 2006; AINA, 2006; 20% H International conference on Vienna, Austria Apr. 18-20, 2006.
Joonbok, Lee et al. "Compressed High Definition Television (HDTV) Over IPv6," Applications and the Internet Workshops, 2006; Saint Workshops, 2006; International Symposium, Phoenix, AZ, USA, Jan. 23-27, 2006.
Lowekamp, B. et al. "A Hierarchy of Network Performance Characteristics for Grid Applications and Services," GGF Network Measurements Working Group, pp. 1-29, May 24, 2004.
Meyer, Derrick "MyReplayTV™ Creates First-Ever Online Portal to Personal TI! Service; Gives Viewers Whole New Way to Interact With Programming," http://web.archive.org/web/20000815052751/http://www.myreplaytv.com/, Aug. 15, 2000.
Sling Media "Sling Media Unveils Top-of-Line Slingbox PRO-HD" [online], Jan. 4, 2008, XP002560049; retrieved from the Internet: URL:www.slingmedia.com/get/pr-slingbox-pro-hd.html; retrieved on Oct. 12, 2009.

Srisuresh, P. et al. "Traditional IP Network Address Translator (Traditional NAT)," Network Working Group, The Internet Society, Jan. 2001.

Lucas, Brian et al. "Systems and Methods for Establishing Connections Between Devices Communicating Over a Network," U.S. Appl. No. 12/426,103, filed Apr. 17, 2009.

Thiyagarajan, Venkatesan et al. "Always-On-Top Media Player Launched From a Web Browser," U.S. Appl. No 12/617,271, filed Nov. 12, 2009.

Paul, John Michael et al. "Systems and Methods for Delivering Messages Over a Network," U.S. Appl. No. 12/619,192, filed Nov. 16, 2009.

Rao, Padmanabha R. et al. "Methods and Apparatus for Establishing Network Connections Using an Inter-Mediating Device," U.S. Appl. No. 12/642,368, filed Dec. 18, 2009.

Dham, Vikram et al. "Systems and Methods for Establishing Network Connections Using Local Mediation Services," U.S. Appl. No. 12/644,918, filed Dec. 22, 2009.

Paul, John et al. "Systems and Methods for Remotely Controlling Media Server Via a Network," U.S. Appl. No. 12/645,870, filed Dec. 23, 2009.

Bajpal, Parimal et al. "Method and Node for Transmitting Data Over a Communication Network using Negative Ackhowledgement," U.S. Appl. No. 12/404,920, filed Mar. 16, 2009.

Bajpal, Parimal et al. "Method and Note for Employing Network connections Over a Connectinoless Transport Layer Protocol," U.S. Appl. No. 12/405,062, filed Mar. 16, 2009.

Asnis, Ilya et al. "Mediated Network address Translation Traversal" U.S. Appl. No. 12/405,039, filed Mar. 16, 2009.

Conway, Frank et al. "Systems and Methods for Creating Variable Length Clips from a Media Stream," U.S. Appl. No. 12/347,465, filed Dec. 31, 2008.

Bajpai, Parimal et al. "Systems and Methods of Controlling the Encoding of a Media Stream," U.S. Appl. No. 12/339,878, filed Dec. 19, 2008.

Rao, Padmanabha R. "Systems and Methods for Linking Media Content," U.S. Appl. No. 12/359,784, filed Jan. 26, 2009.

Banger, Shashidhar et al. "Systems and Methods for Determining Attributes of Media Items Accessed Via a Personal Media Broadcaster," U.S. Appl. No. 12/334,959, filed Dec. 15, 2008.

Kulkarni, Anant Madhava "Systems and Methods for Creating Logical Media Streams for Media Storage and Playback," U.S. Appl. No. 12/323,907, filed Nov. 26, 2008.

Krikorian, Blake Gary et al. "Systems and Methods for Projecting Images From a Computer System," U.S. Appl. No. 12/408.460, filed Mar. 20, 2009.

Krikorian, Blake Gary et al. "Systems and Methods for Presenting Media Content Obtained From Multiple Sources," U.S. Appl. No. 12/408,456, filed Mar. 20, 2009.

International Search Report and Written Opinion for International Application No. PCT/US2008/080910, mailed Feb. 16, 2009.

International Search Report and Written Opinion for International Application No. PCT/US2006/025911, mailed Jan. 3, 2007.

International Search Report for International Application No. PCT/US2007/063599, mailed Dec. 12, 2007.

International Search Report for International Application No. PCT/US2007/076337, mailed Oct. 20, 2008.

International Search Report and Written Opinion for International Application No. PCT/US2006/025912, mailed Jul. 17, 2008.

International Search Report for International Application No. PCT/US2008/059613, mailed Jul. 21, 2008.

Sony Corporation "LocationFree Player Pak—LocationFree Base Station—LocationFree Player" [Online] 2005, XP002512401; retrieved from the Internet: <URL:http://www.docs.sony.com/release/LFPK1.pdf>; retrieved on Jan. 28, 2009.

Wikipedia "Slingbox" [Online], Oct. 21, 2007, XP002512399; retrieved from the Internet: <URL:http://en.wikipedia.org/w/index.php?title=Slingbox&oldid=166080570>; retrieved on Jan. 28, 2009.

Capable Networks LLC "Keyspan Remote Control—Controlling Your Computer With a Remote" [Online], Feb. 21, 2006, XP002512495; retrieved from the Internet: <URL:http://www.slingcommunity.com/article/11791/Keyspan-Remote-Control---Controlling-Your-Computer-With-a-Remote/?highlight=remote+control>; retrieved on Jan. 28, 2009.

Wikipedia "LocationFree Player" [Online], Sep. 22, 2007, XP002512400; retrieved from the Internet: <URL: http://en.wikipedia.org/w/index.php?title=LocationFree_Player&oldid=159683564>; retrieved on Jan. 28, 2009.

Sling Media Inc. "Slingbox User Guide" [Online] 2006, XP002512553; retrieved from the Internet: <URL:http://www.slingmedia.hk/attach/en-US_Slingbox_User_Guide_v1.2.pdf>; retrieved on Jan. 29, 2009.

Sony Corporation "LocationFree TV" [Online], 2004, SP002512410; retrieved from the Internet: <URL:http://.www.docs.sony.com/release/LFX1_X5revision.pdf>; retrieved on Jan. 28, 2009 [note—document uploaded in two parts as file exceeds the 25MB size limit].

China State Intellectual Property Office "Office Action" issued Mar. 18, 2010 for Application No. 200680022520.6.

China State Intellectual Property Office "Office Action" issued Apr. 13, 2010 for Application No. 200580026825.X.

Canadian Intellectual Property Office "Office Action" mailed Feb. 18, 2010 for Application No. 2569610.

European Patent Office "European Search Report," mailed May 7, 2010 for Application No. 06786174.0.

Margulis, Neal "Apparatus and Method for Effectively Implementing a Wireless Television System," U.S. Appl. No. 12/758,193, filed Apr. 12, 2010.

Margulis, Neal "Apparatus and Method for Effectively Implementing a Wireless Television System," U.S. Appl. No. 12/758,194, filed Apr. 12, 2010.

Margulis, Neal "Apparatus and Method for Effectively Implementing a Wireless Television System," U.S. Appl. No. 12/758,196, filed Apr. 12, 2010.

Kirkorian, Jason Gary et al. "Personal Media Broadcasting System with Output Buffer," U.S. Appl. No. 12/757,697, filed Apr. 9, 2010.

Tarra, Raghuveer et al. "Firmware Update for Consumer Electronic Device," U.S. Appl. No. 12/757,714, filed Apr. 9, 2010.

European Patent Office, European Search Report for European Application No. EP 08 16 7880, mailed Mar. 4, 2009.

Mythtv Wiki, "MythTV User Manual" [Online], Aug. 27, 2007, XP002515046; retrieved from the Internet: <URL: http://www.mythtv.org/wiki?title=User_Manual:Introduction&oldid=25549>.

International Searching Authority, Written Opinion and International Search Report for International Application No. PCT/US2008/077733, mailed Mar. 18, 2009.

International Searching Authority, Written Opinion and International Search Report for International Application No. PCT/US20081087005, mailed Mar. 20, 2009.

Watanabe Y. et al., "Multimedia Database System for TV Newscasts and Newspapers"; Lecture Notes in Computer Science, Springer Verlag, Berlin, Germany; vol. 1554, Nov. 1, 1998, pp. 208-220, XP002402824, ISSN: 0302-9743.

Yasuhiko Watanabe et al., "Aligning Articles in TV Newscasts and Newspapers"; Proceedings of the International Conference on Computationallinguistics, XX, XX, Jan. 1, 1998, pp. 1381-1387, XP002402825.

Sodergard C. et al., "Integrated Multimedia Publishing: Combining TV and Newspaper Content on Personal Channels"; Computer Networks, Elsevier Science Publishers B.V., Amsterdam, Netherlands; vol. 31, No. 11-16, May 17, 1999, pp. 1111-1128, XP004304543, ISSN: 1389-1286.

Ariki Y. et al., "Automatic Classification of TV News Articles Based on Telop Character Recognition"; Multimedia Computing and Systems, 1999; IEEE International Conference on Florence, Italy, Jun. 7-11, 1999, Los Alamitos, California, USA, IEEE Comput. Soc. US; vol. 2, Jun. 7, 1999, pp. 148-152, XP010519373, ISBN: 978-0-7695-0253-3; abstract, paragraph [03.1], paragraph [052], figures 1,2.

USPTO, Non-Final Office Action mailed Dec. 17, 2004; U.S. Appl. No. 09/809,868, filed Mar. 15, 2001.

USPTO, Final Office Action mailed Jul. 28, 2005; U.S. Appl. No. 09/809,868, filed Mar. 15, 2001.

USPTO, Non-Final Office Action mailed Jan. 30, 2006; U.S. Appl. No. 09/809,868, filed Mar. 15, 2001.

USPTO, Final Office Action mailed Aug. 10, 2006; U.S. Appl. No. 09/809,868, filed Mar. 15, 2001.
USPTO, Non-Final Office Action mailed Jun. 19, 2007; U.S. Appl. No. 09/809,868, filed Mar. 15, 2001.
USPTO, Non-Final Office Action mailed Apr. 16, 2008; U.S. Appl. No. 09/809,868, filed Mar. 15, 2001.
USPTO, Final Office Action mailed Sep. 18, 2008; U.S. Appl. No. 09/809,868, filed Mar. 15, 2001.
USPTO, Non-Final Office Action mailed Mar. 31, 2009; U.S. Appl. No. 09/809,868, filed Mar. 15, 2001.
USPTO, Non-Final Office Action mailed May 1, 2008; U.S. Appl. No. 11/111,265, filed Apr. 21, 2005.
USPTO, Final Office Action mailed Dec. 29, 2008; U.S. Appl. No. 11/111,265, filed Apr. 21, 2005.
USPTO, Non-Final Office Action mailed Jun. 8, 2009; U.S. Appl. No. 11/111,265, filed Apr. 21, 2005.
USPTO, Non-Final Office Action mailed Jun. 26, 2008; U.S. Appl. No. 11/620,707, filed Jan. 7, 2007.
USPTO, Final Office Action mailed Oct. 21, 2008; U.S. Appl. No. 11/620,707, filed Jan. 7, 2007.
USPTO, Non-Final Office Action mailed Mar. 25, 2009; U.S. Appl. No. 11/620,707, filed Jan. 7, 2007.
USPTO, Non-Final Office Action mailed Aug. 7, 2008; U.S. Appl. No. 11/620,711, filed Jan. 7, 2007.
USPTO, Final Office Action mailed Feb. 9, 2009; U.S. Appl. No. 11/620,711, filed Jan. 7, 2007.
USPTO, Non-Final Office Action mailed Feb. 25, 2009; U.S. Appl. No. 11/683,862, filed Mar. 8, 2007.
USPTO, Non-Final Office Action mailed Dec. 24, 2008; U.S. Appl. No. 11/147,985, filed Jun. 7, 2005.
USPTO, Non-Final Office Action mailed Jun. 25, 2008; U.S. Appl. No. 11/428,254, filed Jun. 30, 2006.
USPTO, Final Office Action mailed Feb. 6, 2009; U.S. Appl. No. 11/428,254, filed Jun. 30, 2006.
USPTO, Non-Final Office Action mailed May 15, 2009; U.S. Appl. No. 11/147,664, filed Jun. 7, 2005.
Sonic Blue "ReplayTV 5000 User's Guide," 2002, entire document.
Bluetooth-News; Main Future User Models Document Verification & Qualification: Bluetooth Technical Background, Apr. 21, 1999; pp. 1 of 7 and 2 of 7; http://www.bluetooth.com/v2/news/show.asp 1-2.
Microsoft Corporation; Harman/Kardon "Master Your Universe" 1999.
Matsushita Electric Corporation of America MicroCast: Wireless PC Multimedia Transceiver System, Nov. 1998.
"Wireless Local Area Networks: Issues in Technology and Standards" Jan. 6, 1999.
USPTO, Final Office Action mailed Jun. 25, 2009; U.S. Appl. No. 11/147,985, filed Jun. 7, 2005.
Lee, M. et al. "Video Frame Rate Control for Non-Guaranteed Network Services with Explicit Rate Feedback," Globecom'00, 2000 IEEE Global Telecommunications conference, San Francisco, CA, Nov. 27-Dec. 1, 2000; [IEEE Global Telecommunications Conference], New York, NY; IEEE, US, vol. 1,Nov. 27, 2000, pp. 293-297, XP001195580; ISBN: 978-0-7803-6452-3, lines 15-20 of sec. II on p. 293, fig. 1.
European Patent Office, International Searching Authority, "International Search Report and Written Opinion," mailed Jun. 4, 2010 for International Application No. PCT/IN2009/000728, filed Dec. 18, 2009.
USPTO Non-Final Office Action mailed Jun. 23, 2010; U.S. Appl. No. 11/933,969, filed Nov. 1, 2007.
Korean Intellectual Property Office "Official Notice of Preliminary Rejection," issued Jun. 18, 2010; Korean Patent Application No. 10-2008-7021254.
China State Intellectual Property Office "First Office Action," issued Jul. 31, 2009, for Application No. 200580026825.X.
USPTO, Non-Final Office Action, mailed Aug. 4, 2009; U.S. Appl. No. 11/734,277, filed Apr. 12, 2007.
USPTO, Final Office Action, mailed Jul. 31, 2009; U.S. Appl. No. 11/683,862, filed Mar. 8, 2007.
USPTO, Non-Final Office Action, mailed Aug. 5, 2009; U.S. Appl. No. 11/147,663, filed Jun. 7, 2005.
USPTO, Non-Final Office Action, mailed Sep. 3, 2009; U.S. Appl. No. 11/620,711, filed Jan. 7, 2007.
Einaudi, Andrew E. et al. "Systems and Methods for Selecting Media Content Obtained from Multiple Sources," U.S. Appl. No. 12/543,278, filed Aug. 18, 2009.
Malode, Deepak Ravi "Remote Control and Method for Automatically Adjusting the Volume Output of an Audio Device," U.S. Appl. No. 12/550,145, filed Aug. 28, 2009.
Akella, Aparna Sarma "Systems and Methods for Event Programming Via a Remote Media Player," U.S. Appl. No. 12/537,057, filed Aug. 6, 2009.
Shah, Bhupendra Natwerlan et al. "Systems and Methods for Transcoding and Place Shifting Media Content," U.S. Appl. No. 12/548,130, filed Aug. 26, 2009.
Banger, Shashidhar et al. "Systems and Methods for Automatically Controlling the Resolution of Streaming Video Content," U.S. Appl. No. 12/537,785, filed Aug. 7, 2009.
Panigrahi, Biswaranjan "Home Media Aggregator System and Method," U.S. Appl. No. 12/538,681, filed Aug. 10, 2009.
Nandury, Venkata Kishore "Adaptive Gain Control for Digital Audio Samples in a Media Stream," U.S. Appl. No. 12/507,971, filed Jul. 23, 2009.
Shirali, Amey "Systems and Methods for Providing Programming Content," U.S. Appl. No. 12/538,676, filed Aug. 10, 2009.
Thiyagarajan, Venkatesan "Systems and Methods for Virtual Remote Control of Streamed Media," U.S. Appl. No. 12/538,664, filed Aug. 10, 2009.
Thiyagarajan, Venkatesan et al. "Localization Systems and Method," U.S. Appl. No. 12/538,783, filed Aug. 10, 2009.
Shirali, Amey et al. "Methods and Apparatus for Seeking Within a Media Stream Using Scene Detection," U.S. Appl. No. 12/538,784, filed Aug. 10, 2009.
Thiyagarajan, Venkatesan "Systems and Methods for Updating Firmware Over a Network," U.S. Appl. No. 12/538,661, filed Aug. 10, 2009.
Iyer, Satish "Methods and Apparatus for Fast Seeking Within a Media Stream Buffer," U.S. Appl. No. 12/538,659, filed Aug. 10, 2009.
European Patent Office, International Searching Authority, "International Search Report," for International Application No. PCT/US2009/049006, mailed Sep. 11, 2009.
Krikorian, Jason, U.S. Appl. No. 11/734,277, filed Apr. 12, 2007.
Tarra, Raghuveer et al., U.S. Appl. No. 60/975,239, filed Sep. 26, 2007.
Williams, George Edward, U.S. Appl. No. 12/167,041, filed Jul. 2, 2008.
Rao, Padmanabha R., U.S. Appl. No. 12/166,039, filed Jul. 1, 2008.
International Search Report and Written Opinion, PCT/US2005/020105, Feb. 15, 2007, 6 pages.
International Search Report and Written Opinion for PCT/US2006/04382, mailed Apr. 27, 2007.
Archive of "TV Brick Home Server," www.tvbrick.com, [online] [Archived by http://archive.org on Jun. 3, 2004; Retrieved on Apr. 12, 2006] retrieved from the Internet <URL:http://web.archive.org/web/20041107111024/www.tvbrick.com/en/affiliate/tvbs/tvbrick/document18/print>.
Faucon, B. "TV 'Brick' Opens up Copyright Can of Worms," Financial Review, Jul. 1, 2003, [online [Retrieved on Apr. 12, 2006] Retrieved from the Internet, URL:http://afr.com/cgi-bin/newtextversions.pl?storyid+1056825330084&3ate+2003/07/01&pagetype+printer§ion+1053801318705&path+articles/2003/06/30/0156825330084.html].
Balster, Eric J., "Video Compression and Rate Control Methods Based on the Wavelet Transform," The Ohio State University 2004, pp. 1-24.
Kulapala et al., "Comparison of Traffic and Quality Characteristics of Rate-Controlled Wavelet and DCT Video," Arizona State University, Oct. 11, 2004.
Skodras et al., "JPEG2000: The Upcoming Still Image Compression Standard," May 11, 2000, 14 pages.
Taubman et al., "Embedded Block Coding in JPEG2000," Feb. 23, 2001, pp. 1-8 of 36.
Kessler, Gary C., An Overview of TCP/IP Protocols and the Internet; Jan. 16, 2007, retrieved from the Internet on Jun. 12, 2008 at http:// www.garykessler.net/library/tcpip.html; originally submitted to the InterNIC and posted on their Gopher site on Aug. 5, 1994.

Roe, Kevin, "Third-Party Observation Under EPC Article 115 on the Patentability of an Invention," Dec. 21, 2007.

Roe, Kevin, Third-Party Submission for Published Application Under CFR §1.99, Mar. 26, 2008.

European Patent Office, International Searching Authority, "International Search Report," mailed Mar. 30, 2010; International Application PCT/US2009/068468 filed Dec. 27, 2009.

USPTO Final Office Action mailed Mar. 3, 2010; U.S. Appl. No. 11/111,265, filed Apr. 21, 2005.

USPTO Final Office Action mailed Mar. 12, 2010; U.S. Appl. No. 11/620,711, filed Jan. 7, 2007.

USPTO Non-Final Office Action mailed Mar. 19, 2010; U.S. Appl. No. 11/147,664, filed Jun. 7, 2005.

USPTO Non-Final Office Action mailed Mar. 31, 2010; U.S. Appl. No. 11/620,707, filed Jan. 7, 2007.

USPTO Non-Final Office Action mailed Apr. 1, 2010; U.S. Appl. No. 12/237,103 filed Sep. 24, 2008.

Qiong, Liu et al. "Digital Rights Management for Content Distribution," Proceedings of the Australasian Information Security Workshop Conference on ACSW Frontiers 2003, vol. 21, 2003, XP002571073, Adelaide, Australia, ISSN: 1445-1336, ISBN: 1-920682-00-7, sections 2 and 2.1.1.

China State Intellectual Property Office "First Office Action," issued Jan. 8, 2010, for Application No. 200810126554.0.

USPTO Final Office action mailed Jan. 25, 2010; U.S. Appl. No. 11/734,277, filed Apr. 12, 2007.

Australian Government "Office Action," Australian Patent Application No. 2006240518, mailed Nov. 12, 2009.

Jain, Vikal Kumar "Systems and Methods for Coordinating Data Communication Between Two Device," U.S. Appl. No. 12/699,280, filed Feb. 3, 2010.

Gangotri, Arun L. et al. "Systems and Methods and Program Applications for Selectively Restructuring the Placeshiftnig of Copy Protected Digital Media Content," U.S. Appl. No. 12/623,955, filed Nov. 23, 2009.

Paul, John et al. "Systems and Methods for Searching Media Content," U.S. Appl. No. 12/648,024, filed Dec. 28, 2009.

Newton's Telcom Dictionary, 20th ed., Mar. 2004.

"The Authoritative Dictionary of IEEE Standard Terms," 7th ed. 2000.

Gurzhi, Alexander et al. "Systems and Methods for Emulation Network-Enabled Media Components," U.S. Appl. No. 12/711,830, filed Feb. 24, 2010.

\* cited by examiner

SYSTEMS AND METHODS FOR CONTROLLING MEDIA DEVICES

PRIORITY CLAIM

This application claims priority to U.S. Provisional Patent Application Ser. No. 60/981,993, entitled "USER INTERFACE FOR MEDIA DEVICE THAT CONTROLS OTHER MEDIA DEVICES" and filed on Oct. 23, 2007, which is incorporated herein by reference.

TECHNICAL FIELD

Various embodiments relate to user interfaces for media devices, as well as mechanisms to control media devices that control other media devices.

BACKGROUND

Many media devices have been developed to provide different functionalities. A typical home theater system, for example, includes multiple media devices such as a DVD player, a timeshifting device (e.g., digital video recorder (DVR)), and a place-shifting device (e.g., Sling-Box from Sling Media, Inc.). In order to control these various media devices, customers typically juggle or switch between multiple remote controls, which can be inconvenient and confusing.

One approach to solve this problem is to use a universal remote control, which is typically a remote control that has been preprogrammed to operate a variety of devices in parallel. When a user wants to control a device, the user may press a mode button on the universal remote control to switch the remote to the intended device, and then use the universal remote control to control the device. When the user wants to control a different device, he or she generally needs to switch the universal remote control to that other device the universal remote controlling the other device.

This approach is insufficient for many applications because it does not typically allow for seamless operation. Users must generally first figure out which device to control before using the universal remote control, which can be confusing when multiple devices are involved.

In addition, this approach does not typically function when the multiple devices are controlled through one another. For example, assume a local device (e.g., a set-top box) connects to and controls a remote device (e.g., a place-shifting device). Users of the universal remote control cannot generally control both devices easily, because the remote device is controlled through the local one. The universal remote control is generally designed to control multiple devices in parallel, by operating with each of them individually and directly; as a result, the universal remote does not typically work optimally in setting where the remote is asked to control one device through another.

Therefore, there is a need in the art for a way to enable users to control multiple devices seamlessly, including remote, down-stream devices. There is also a need for an efficient and intuitive user interface.

BRIEF SUMMARY

Various exemplary embodiments relate to systems and methods for processing user inputs received from a remote control. In a first exemplary embodiment, a method of processing an input received from a user via a remote control suitably comprises presenting a media stream on a display and receiving the input from the remote control at a local device associated with the display. The local device determines if the input is intended for the local device or a remote device. If the input is intended for the local device, the input is processed at the local device. If the input is intended for the remote device, a signal is transmitted from the local device to the remote device to thereby allow the remote device to respond to the input.

In another embodiment, a method of processing an input received from a user via a remote control suitably comprises presenting first imagery on a display, wherein the first imagery comprises a presentation of a media stream having a periphery and an interface feature comprising a first plurality of input options, and wherein the first plurality of input options is arranged around the periphery of the presentation of the media stream on the display. The input is received from the remote control at a local device associated with the display, wherein the input is a directional input having a direction corresponding to one of the first plurality of input options. In response to the directional input, second imagery is presented on the display, wherein the second imagery comprises a second plurality of input options that is presented adjacent to the presentation of the media stream on the display in a direction from the presentation of the media stream that corresponds to the direction of the input.

In still other embodiments, a system for processing an input received via a remote control from a viewer of a display comprises a wireless receiver configured to receive the input from the remote control, a network interface configured to be coupled to a network, a display interface configured to be coupled to the display; and a processor. The processor is configured to receive the input from the wireless receiver, to receive a media stream from a remote device via the network interface, to present imagery comprising the media stream on the display via the display interface, to process the input at the local device if the input is intended for the local device, and to transmit a signal to the remote device via the network to thereby allow the remote device to respond to the input if the input is intended for the remote device.

BRIEF DESCRIPTION OF THE DRAWINGS

The disclosed embodiments have other advantages and features which will be more readily apparent from the detailed description, the appended claims, and the accompanying drawings, in which:

DETAILED DESCRIPTION OF EXEMPLARY EMBODIMENTS

Alternative embodiments of the structures and methods illustrated herein may be employed without departing from the principles of the invention described herein.

Embodiments of the present disclosure provide a user interface for users to interact with a media device, as well as a method for users to control multiple devices through a single device. The user interface may be implemented on any sort of device, including any sort of media player, time or place shifting device, receiver, recorder, set-top box or the like. While some embodiments may implement both the interfaces and the control features described herein for a high level of functionality and convenience, it is not necessary that embodiments of the user interface include the ability to control multiple devices, nor is it necessary that multi-device embodiments make use of the user interface features described herein.

System Architecture of an Exemplary Embodiment

Figure 1A:
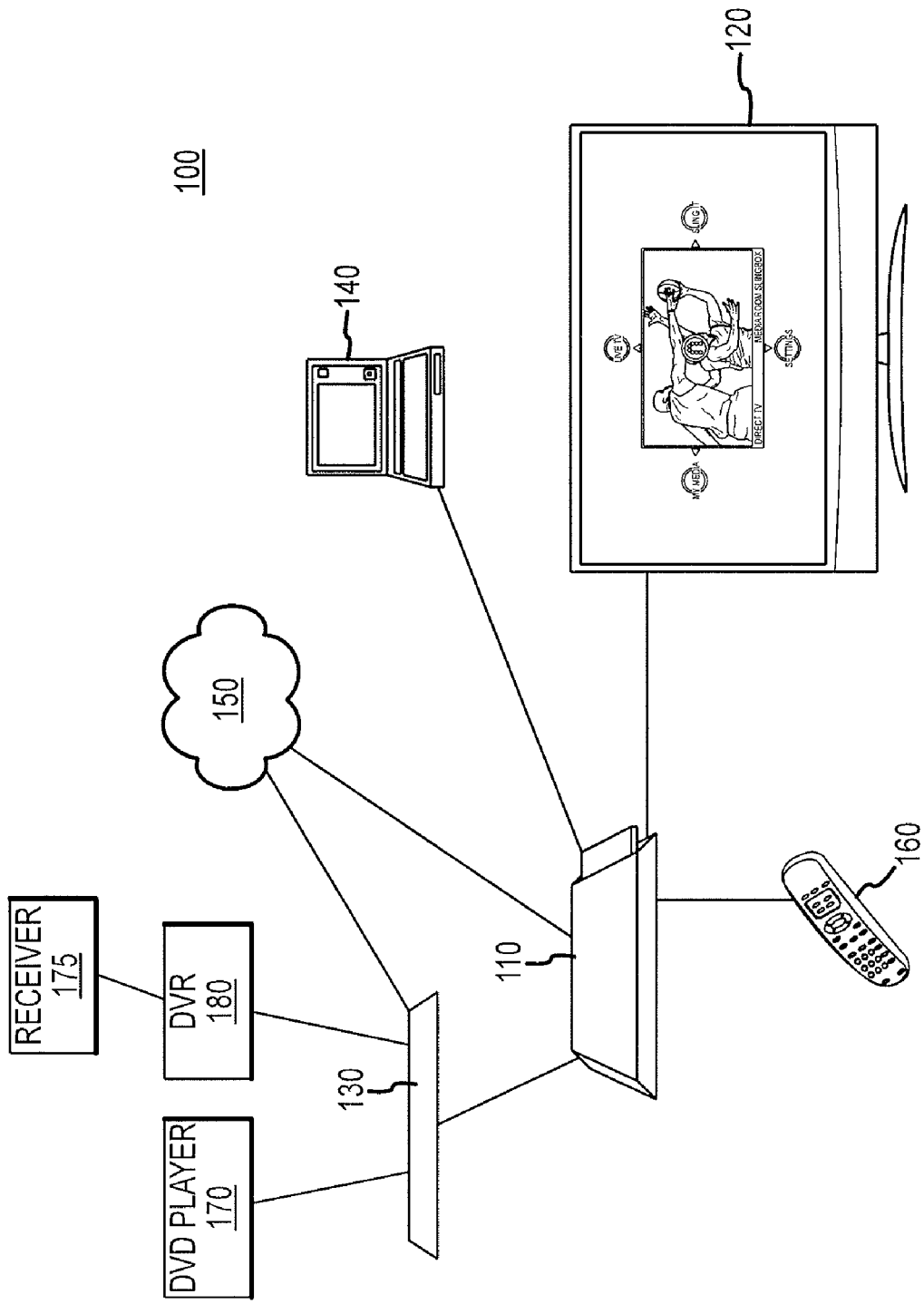
FIG. 1A is a diagram illustrating an exemplary media system.

FIG. (FIG.) 1A is a diagram illustrating one exemplary embodiment of a media device environment 100. As illustrated, the environment 100 includes a media device 110 connected with a television or other display 120. The media device 110 communicates with a remote control 160. The media device 110 is suitably connected with a place-shifting device 130, a personal computer 140, and the Internet (or another network) 150. The place-shifting device 130 is shown in FIG. 1 to be connected with a DVD player 170 and/or a DVR 180. In various embodiments, DVR 180 receives a television or other signal from a cable or satellite set top box, antenna or other media receiver 175. Alternately, a receiver 175 may be directly connected to placeshifting device 130, media device 110 and/or display 120 as desired, or receiver 175 may be omitted entirely.

In FIG. 1A, place-shifting device 130 is also shown connected to the Internet 150 directly and/or through one or more other networks. In this example, the network may be a wired or wireless network. Examples of the network include the Internet, a local area network (LAN), a WiFi network, a WiMAX network, a mobile telephone network, or any combination thereof. In various embodiments, placeshifting device 130 is able to receive a media stream from one or more sources (e.g., receiver 175, DVR 180, DVD player 170 and/or the like), to convert the received media stream to a format that is compatible with the network, and to transmit the "place shifted" media stream over network to a remote player such as a player associated with a mobile phone, portable computer, remotely-located television, and/or the like. Placeshifting device 130 may transmit a media stream over the network to media device 110, for example, which then is able to convert the received stream from the network format into a format that can be presented to the viewer on display 120 as desired. One example of the place-shifting device 130 is described in detail in U.S. patent application Ser. No. 11/147,664 entitled "Personal Media Broadcasting System," filed on Jun. 7, 2005 (published as U.S. Patent Publication No. 2006/0095471), which is incorporated by reference herein in its entirety, although other embodiments may use different types of place shifting or other devices.

The media device 110 may receive media content from the place-shifting device 130, the personal computer 140, the Internet 150, a cable, satellite or broadcast television receiver, any remote media devices that may be present, and/or any other sources as appropriate. In the example of FIG. 1A, media device may receive media content from the DVD player 170 or the DVR 180 indirectly through the place-shifting device 130, although other embodiments may provide media content directly to the device 110 as appropriate. Various other sources of media not shown in FIG. 1A could also be present. Generally, media device 110 is able display the received media content on the display 120. Users may interact with the media device 110 through the remote control 160.

Figure 1B:
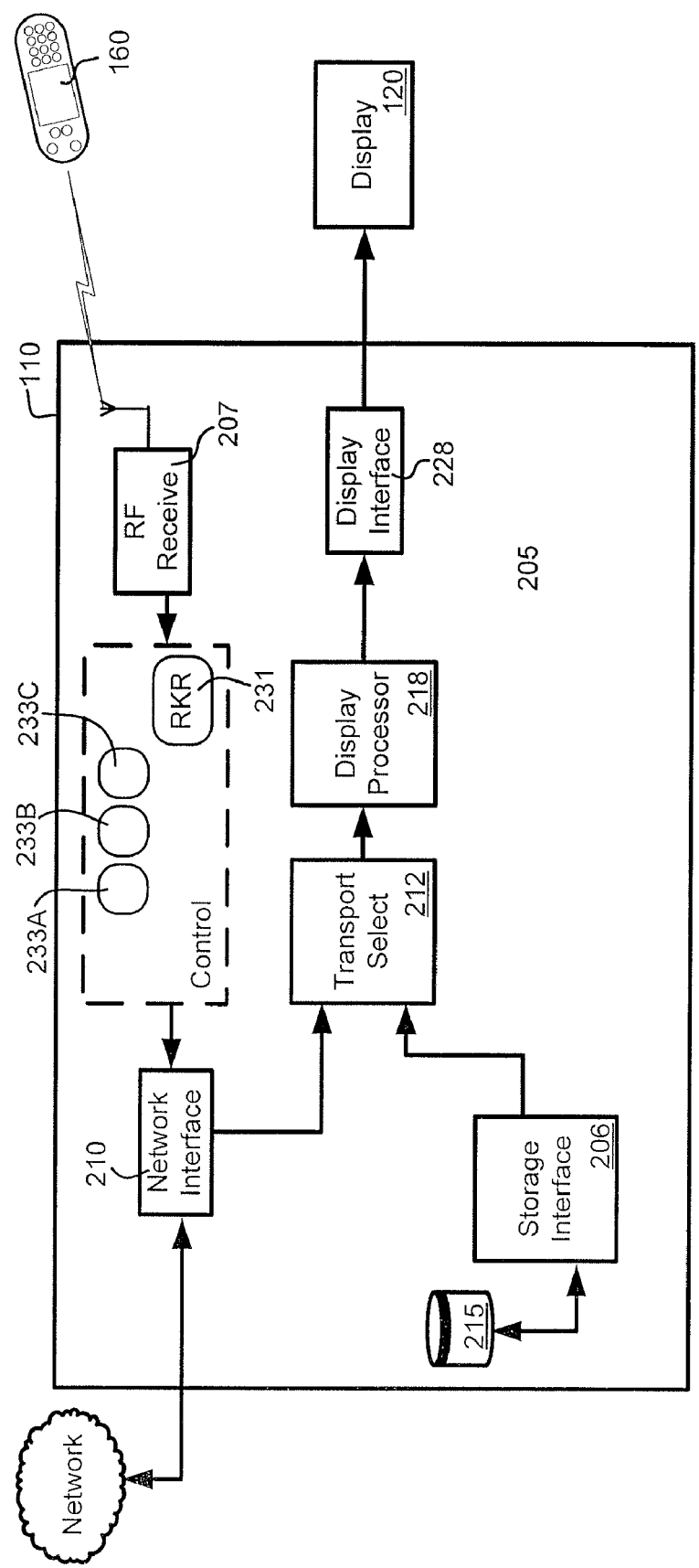
FIG. 1B is a block diagram of an exemplary media device.

FIG. 1B provides additional detail about an exemplary media device 110 that includes a network interface 210, a storage interface 206, and a display interface 228 as appropriate. FIG. 1B also shows a transport select module, display processor module and control module 205, which may all execute on a common processor as appropriate. Other embodiments may incorporate additional or alternate processing modules from those shown in FIG. 1B, and/or may omit one or more modules shown in FIG. 1B, and/or may organize the various modules in any other manner different from the exemplary arrangement shown in FIG. 1B.

Media device 110 may be logically and physically implemented in any manner. FIG. 1B shows various logical and functional features that may be present in an exemplary device 110; each module shown in the figure may be implemented with any sort of hardware, software, firmware and/or the like. Any of the various modules may be implemented with any sort of general or special purpose integrated circuitry, for example, such as any sort of microprocessor, microcontroller, digital signal processor, programmed array and/or the like. In various embodiments, any number of the modules shown in FIG. 1B may be implemented as part of a "system on a chip" (SoC) using any suitable processing circuitry under control of any appropriate control logic 205. In such embodiments, control logic 205 executes within an integrated SoC or other processor that also implements transport selector 212 and display processor 218, as well as any logic that controls network interface 210 and/or storage interface 206, as appropriate. NXP Semiconductors of Eindhoven, Netherlands, for example, produces several models of processors that are capable of supporting SoC implementations, although products from any number of other suppliers could be equivalently used. In still other embodiments, various distinct chips, circuits or components may be inter-connected with each other to implement the functions represented in FIG. 1B.

Various embodiments of control logic 205 can include any circuitry, components, hardware, software and/or firmware logic capable of controlling the components and processes operating within device 110. Although FIG. 1B shows control logic 205 as a discrete feature, in practice control logic 205 will typically interact with each of the other modules and components operating within media device 110 to direct the operation thereof.

Media device 110 includes an appropriate network interface 210 that operates using any implementation of protocols or other features to support communication by device 110 on the network. In various embodiments, network interface 210 supports conventional LAN, WAN or other protocols (e.g., the TCP/IP or UDP/IP suite of protocols widely used on the Internet) to allow device to communicate on the network as desired. Network interface 210 typically interfaces with the network using any sort of LAN adapter hardware, such as a conventional network interface card (NIC) or the like provided within device 110.

Storage interface 206 is any physical, logical and/or other features that can be used to interface with an internal or external storage medium 215 such as a magnetic or optical disk drive, a flash memory card, and/or any other sort of storage as appropriate. In various embodiments, storage interface 206 is a universal serial bus (USB) or other standard interface that allows users to store files at a conventional computer system (e.g., computer 114 in some embodiments) for playback via media device 110. In such embodiments, media device 110 will typically include a physical interface that can receive the media 106, as well as a logical interface that may be implemented within the SoC or other logical features of device 110 to execute in response to control logic 205.

In many embodiments, media device 110 includes an input interface 207 that receives infrared or other wireless instructions from remote control 160. Input interface 207 may also include any number of buttons, sliders, knobs or other physical input devices located on a housing of device 110. In operation, user instructions provided by remote control 160 and/or any other input features are received at input interface 207 for subsequent processing by control logic 205. In various embodiments, control logic 205 takes appropriate actions based upon the particular inputs received; examples of appropriate actions may include directing display processor 218 to generate or modify the presented imagery, directing a command packet to be sent to a remotely-located content source, and/or any other actions.

Transport stream select module 212 is any hardware and/or software logic capable of selecting a desired media stream from the available sources. In the embodiment shown in FIG. 1B, transport select module 212 is able to select video signals for presentation on one or more output interfaces 228. Stream select module 212 therefore responds to viewer inputs (e.g., via control logic 205) to simply switch content received from a network source 210 or from storage 106 to one or more display processing modules 218.

Display processor module 218 includes any appropriate hardware, software and/or other logic to create desired screen displays at interface 228 as desired. In various embodiments, display processor module 218 is able to decode and/or transcode the received media to a format that can be presented at display interface 228. The generated displays, including received/stored content and any other displays may then be presented to one or more output interfaces 228 in any desired format. In various embodiments, display processor 218 produces an output signal encoded in any standard format (e.g., ITU656 format for standard definition television signals or any format for high definition television signals) that can be readily converted to standard and/or high definition television signals at interface 228.

Display processing module 218 is also able to produce on screen displays (OSDs) for electronic program guide, setup and control, input/output facilitation and/or other features that may vary from embodiment to embodiment. Such displays are not typically contained within the received or stored broadcast stream, but are nevertheless useful to users in interacting with device 110 or the like. In particular, on-screen displays can be used to generate user interfaces that allow convenient program selection, control and the like, as described more fully below.

In operation, then, the user selects desired media content from a network source (e.g., placeshifting device 130, computer 140, or any other component shown in FIG. 1A), and provides appropriate inputs via remote control 160 or the like. The commands are received at input interface 207 and provided to control logic 205, as appropriate. Control logic 205 is then able to contact the appropriate content source via network interface 210, storage interface 206, and/or the like, and to select the desired content using, for example, transport select module 212. The obtained content can then be processed by display processor 218 and received at display interface 228 in an appropriate format so that output signals 105 can be compatible with the external display 104.

Additionally, in various embodiments, media device 110 is also able to transmit control information to a remotely-located media source via network. As user instructions are received from remote control 160, for example, control logic 205 or another feature within media device 110 may formulate a command request message that is transmitted over the network for executing at the remote media source 115 to change the media stream provided by that remote media source 115.

User Interface

The media device 110 illustrated in FIGS. 1A-B generally provides an interface, such as a full-screen multi-level user interface, on the display 120 for users (or viewers) to interact with the media device 110 to control device 110 and/or any devices connected with it (e.g., place-shifting device 130). Users may interact with media device 110 through any sorts of input devices such as remote control 160, a mobile phone, a mobile computing device, and/or a personal computer, just to name a few. In one embodiment, users navigate through the user interface by gesturing in one or different directions using the remote control 160 (e.g., by pressing direction buttons (or keys) on the remote control 160). This user interface may also be suitable for other set-top boxes, personal computers, and/or other consumer electronics devices.

In one embodiment, users may access a top-level user interface (or top-level menu) by pressing a menu button on the remote control 160 or other input device. The remote control 160 sends a signal (or control signal) to the media device 110 indicating that the user pressed the menu button. Upon receiving the signal, the media device 110 displays the top-level user interface in the display 120.

Prior to receiving the signal, media device 110 may be in a stand-by mode or may be actively displaying a live or other video on the display 120, as appropriate. In various embodiments, if the display 120 is displaying video (e.g., live video or any other imagery) when the media device 110 receives the signal, the media device 110 suitably scales the video down and displays it in a video window in the top-level user interface, allowing the user to continue watching the video while navigating through the user interface.

In one embodiment, the top-level user interface includes up to four items (or menu items or controls or options) spatially arranged in a compass-type layout around the video window. Users may select (or access) an item of interest by navigating (or gesturing) to the direction indicated by the spatial location of the item. For example, if the user intends to select the item displayed above the video window, he or she may gesture "up" using the buttons on the remote control 160 (e.g., pressing an "up" arrow or a "direction up" button). Alternatively, the gesture may be provided using a touchpad, joystick, trackball, directional pad or other two-dimensional input device provided on remote control 160. In other embodiments, the top-level user interface may include more than four items spatially arranged around the video window. For example, the top-level user interface may include eight menu items displayed on the four sides (up, down, left, right) and the four corners (top-left, bottom-left, top-right, bottom-right). Other spatial arrangements (e.g., using any sort of row/column, circular, octagonal, or other arrangement) could also be formulated.

Upon receiving a user selection of an item displayed in the top-level user interface (a top-level item), the media device 110 suitably responds in any appropriate manner. In various embodiments, the media device 110 moves the video window in the opposite direction of user navigation and displays a second-level user interface associated with the selected top-level item in the rest display area in the display 120. For example, if the user selects the top-level item displayed on the left of the video window, the media device 110 shifts the video window to the right, and displays a second-level user interface to the left of the video window. Other embodiments may take other actions as appropriate.

The second-level user interface, similar to the first-level user interface, may be spatially arranged in a compass-type layout or the like. In one embodiment, the second level user interface includes up to three items spatially arranged together with the video window in a compass-type layout.

Users may select an item of interest (including the video window) by navigating to the direction indicated by the spatial location of the item. Users may access the top-level user interface by selecting the video window, by pressing a home button on the remote control 160, or by any other technique. By displaying the video window in the opposite direction of user navigation, users may go back to the top-level user interface by navigating to the direction opposite to the previous navigation. For example, if the user navigated left from the top-level user interface to a second-level user interface, he or she can go back to the top-level user interface by navigating right in the second-level user interface.

In one embodiment, the second-level user interface includes an icon (or text or image) identifying the associated top-level item by displaying the icon in (or approximate to) the center, surrounded by the items displayed in the second-level user interface (second level items). This icon indicates to the user the path the user took to reach the current user interface.

Upon user selection of a second-level item in this embodiment, the media device 110 moves the video window in the opposite direction of user navigation and displays a third-level user interface associated with the selected second-level item in the rest display area in the display 120. The third-level user interface and deeper levels of user interface may be displayed and/or interacted in a manner similar to the second-level user interface. For example, the user may select an item displayed in an N-level user interface (an N-level item) to access an (N−1)-level user interface or select the video window to go back to an (N−1)-level user interface. N may be any integer larger than 1. In one embodiment, the media device 110 indicates the context in the current level user interface (e.g., the selected items or path leading to the current level user interface).

As described above, when a user selects an item in a user interface of any level by navigating to a direction, the media device 110 moves the video window to the opposite direction and displays a user interface associated with the selected item in the rest display area. The user interface associated with the selected item may include multiple selectable items. As described above, the media device 110 may display the multiple selectable items in a compass-type layout. When the number of the selectable items is large (e.g., more than about three in some embodiments), the media device 110 may display the items in a vertical (or horizontal) list on one side, and display the video window on the opposite side. Users may navigate through the vertical list by gesturing up or down using the remote control 160. When switching from one level of user interface to another, the media device 110 may insert animation in between, or provide other enhancements as desired.

An example of a user interface is illustrated with respect FIGS. 2-7, which are described in detail below. In the following example, the media device may be, for example, a SLINGCATCHER product, which is a media device developed and distributed by Sling Media, Inc. of Foster City, Calif. Equivalent embodiments, however, may use other media catcher devices other than the SLINGCATCHER product. Similarly, the particular interface images and features presented in the views of FIGS. 2-7 are purely exemplary, and may vary significantly from those of various practical embodiments.

Figure 2:
FIGS. 2-7 are a series of screen shots of an exemplary user interface for a media device.

FIG. 2 is a screen shot of an exemplary full screen live video image displayed on a television by the media device 110. This represents a "default state" or the like prior to activation of the user interface features available in the device. In this state, media device 110 may simply relay video signals from a receiver or other source to display 120; alternately, display 120 may receive media content from another source entirely.

Figure 3:
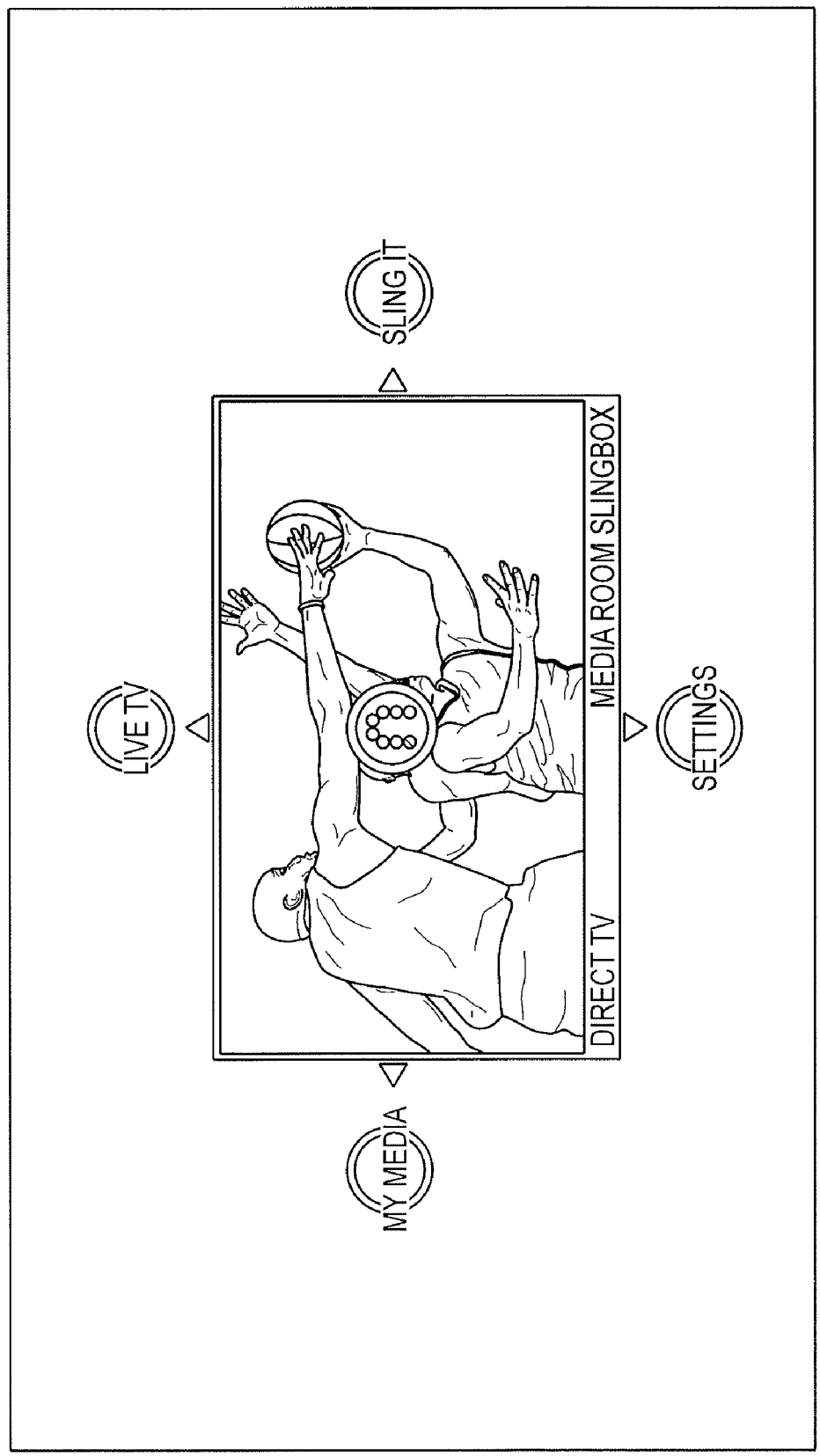

After a user presses a menu button on a remote control 160 associated with the media device 110 or takes another action to initiate the interface, media device 110 displays a top-level user interface on the television, as illustrated in the image of FIG. 3. As shown in FIG. 3, the full screen live video can be scaled to be smaller and displayed in a video window that is integrated into the top-level user interface; other embodiments, however, may simply present the interface without the video, or may present the video in another location. The video window in FIG. 2 displays descriptions of the live video on the bottom by indicating that its original source is "DirectTV" and it is streamed from "Media Room SlingBox"; other sources may be presented as appropriate, or this information may be removed in an alternate embodiment. The top level user interface shown in FIG. 2 also includes the following four items: "Live 'TV," "Sling It," "Settings," and "My Media," displayed above, to the right of, below, and to the left of the video window, respectively. The user may select an item of interest by pressing a navigation button (or key) on the remote control corresponding to the display location of the item. For example, the user may press an up arrow or the like to select "Live TV."

Figure 4:
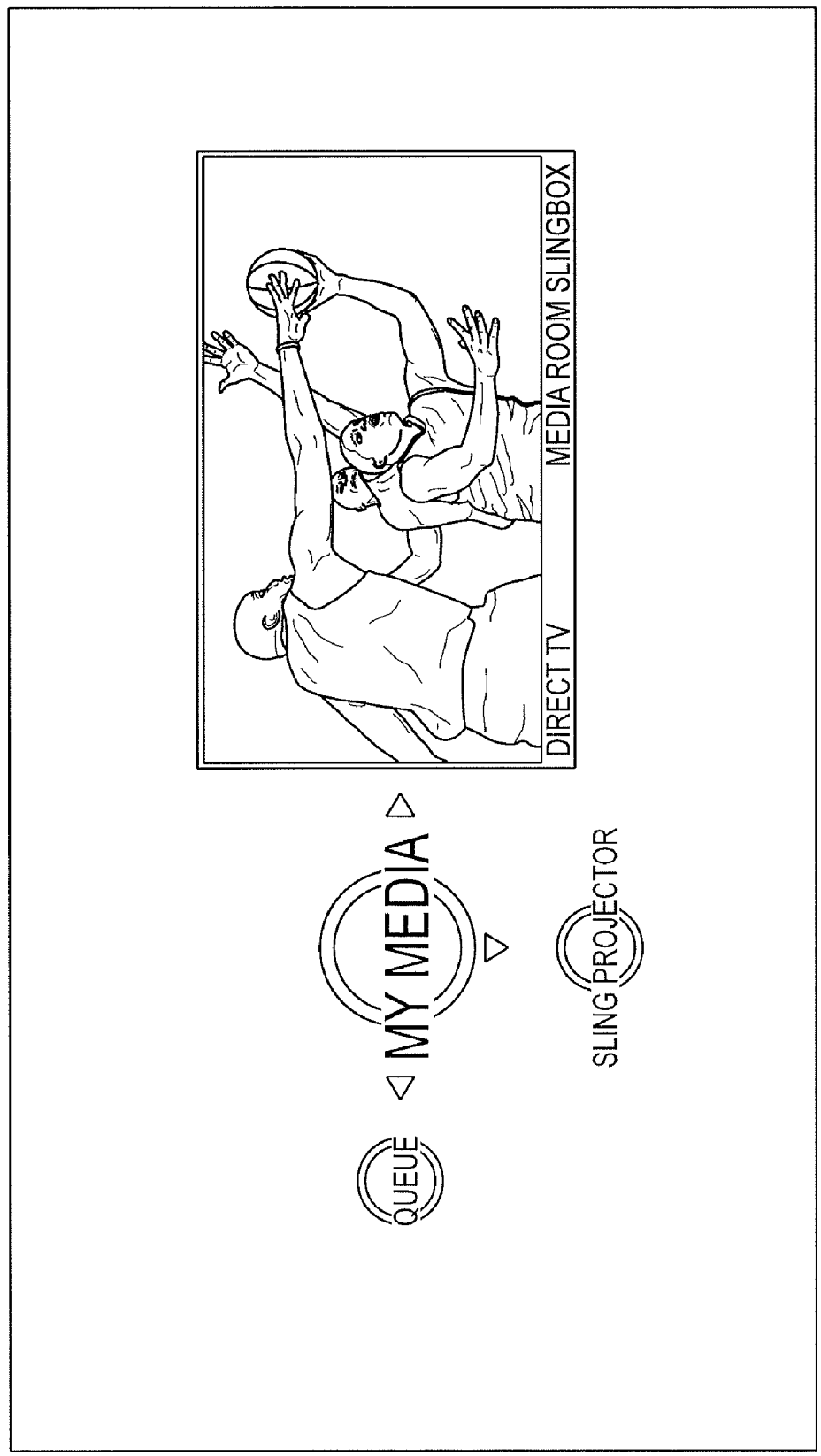

Depending on the user selection, the media device 110 displays a second level user interface associated with the selected top-level item. For example, if the user selected "My Media" by pressing a left arrow or other feature on the remote control 160, the media device 110 could move the video window to the right of the display, opposite to the user navigation. Device 100 could then display additional items (e.g., "Queue" and "Sling Projector" as illustrated in the screen shot of FIG. 4) in the available space to the left of the video window. As shown in FIG. 4, the media device 110 also displays another option, "My Media", approximate to the center of the user interface, indicating its context (e.g., the current user interface is associated with the top-level item "My Media"). Other options (e.g., "Queue," "Sling Projector") and the video window are shown displayed to the left of, below, and to the right of "My Media," accordingly. In this embodiment the user may then select an item of further interest by pressing a navigation button on the remote control or otherwise providing a directional gesture corresponding to the display location of the item. For example, the user may go back to the top-level user interface by pressing a right arrow on the remote control or may access the "Sling Projector" feature by pressing a down arrow. Again, other directional inputs (including gestures applied to a touchpad, directional pad or the like) could be used in any number of equivalent embodiments.

Figure 5:
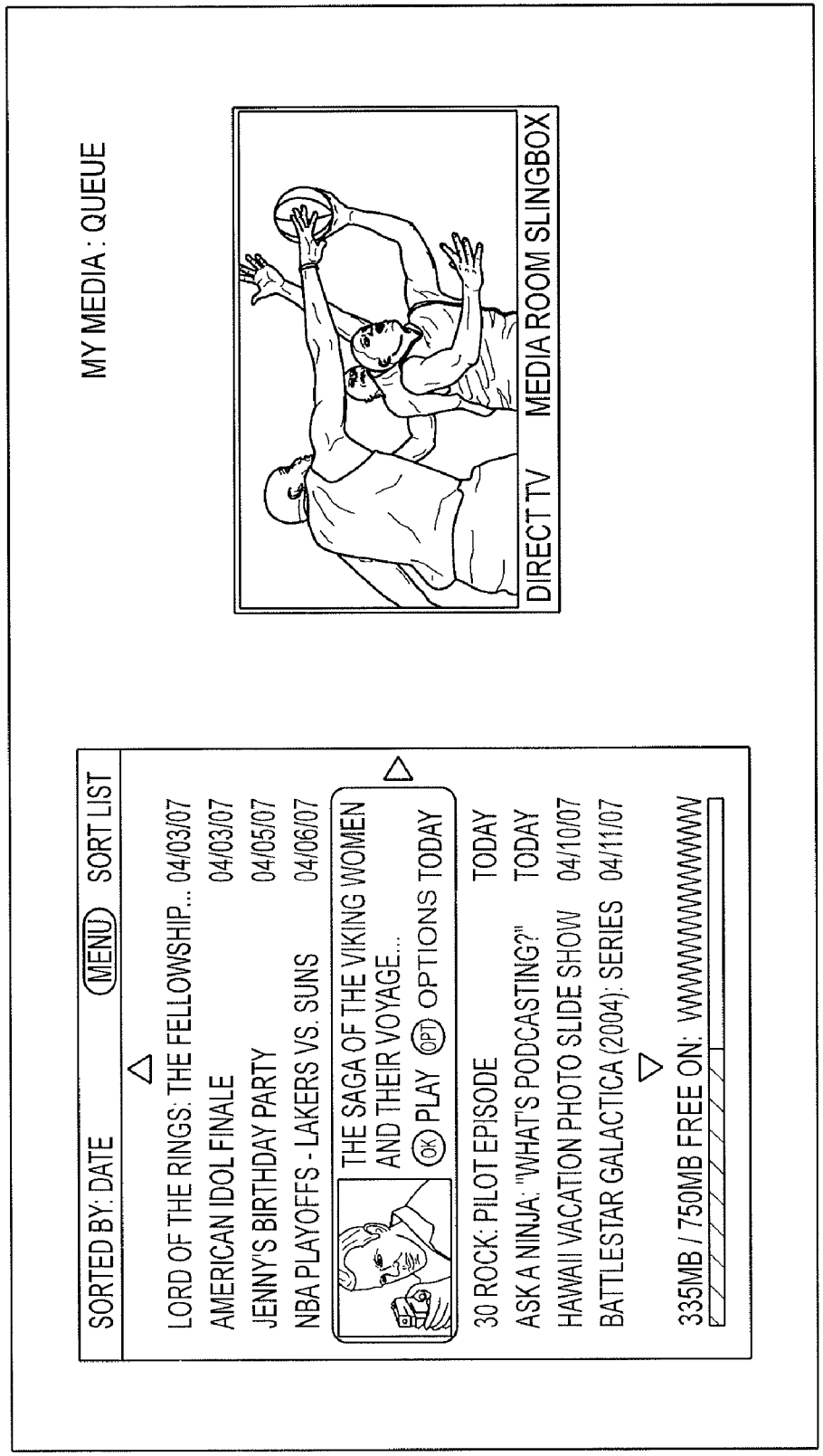

Assuming the user selected "Queue" by providing a "left" indication on the remote control 160, the media device 110 could display a further user interface image such as that shown in FIG. 5, which includes a vertical list of items on the left and the video window on the right. The media device 110 also displays the items leading to the current user interface on the top right corner ("MY MEDIA: QUEUE"). As shown, the vertical list also includes a current item displayed in the middle. In the example of FIG. 5, the current item is displayed with a title of "The Saga of the Viking Women and Their Voyage . . . " along with a thumbnail picture of the corresponding video program. The current item is also shown with an "OK" button for Play and an "OPT" button for Options.

The user may press the "OK button on the remote control 160 to play the corresponding video program in this example, or may press the "OPT" button to view and/or set options related to this item.

The vertical list as shown also displays items above and below the current item by their titles. In this embodiment the user can navigate to the items displayed above the current item by providing an "up" indication, and to items below by providing a "down" indication on the remote control. The user interface may display additional items and hide existing items as the user scrolls up or down the vertical list. The user interface indicates in the top-left corner that the vertical list is sorted by date, and the user may sort the list by pressing the "Menu" button in the remote control.

Figure 6:
Figure 7:
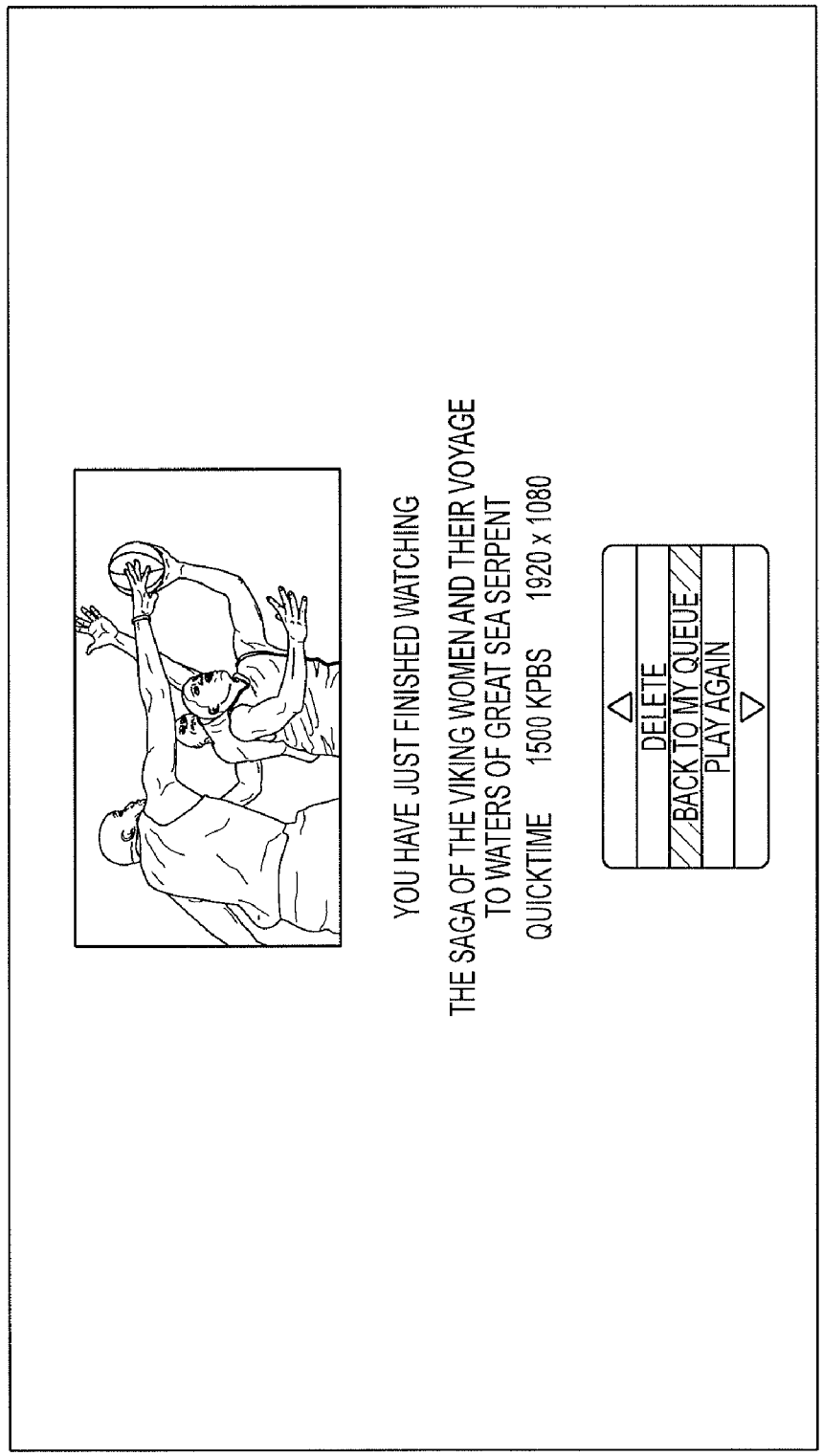

In response to the appropriate input from the user (e.g., depressing an "OK" button on remote 160), the media device 110 plays the video program of the current item in the vertical list on the display 120, as illustrated in the screen shot in FIG. 6. The media device 110 may also display information related to the video program (e.g., title, format, resolution, transmission rate, and progress) overlaying the video as desired and appropriate.

After the video program finishes, the media device 110 suitably scales the video down and displays it in a video window in various embodiments. Media device 110 may also notify viewers that they have finished watching the video program, and may display several options for the viewer to select, as illustrated in the screen shot in FIG. 7. The options shown include "Delete," "Back to My Queue," and "Play Again", although other embodiments may provide additional or fewer features as appropriate. Viewers may navigate among the options using the up and/or down arrows in the remote control.

Remote Control

With primary reference again to FIGS. 1A and 1B, in various embodiments users are able to control multiple devices by interacting with a single device (hereinafter called the local device) that may be connected with multiple remote devices. That is, a single remote control 160 may be used to efficiently provide inputs to multiple devices such as placeshifting device 130, DVD player 170, DVR 180, receiver 175, and/or the like. In such embodiments, the user typically transmits commands (or control signals) with remote control 160 to the local device (e.g., media device 110) to control the local device or the remote devices without specifying the intended target. The local device automatically determines a target device (the device the user intends to direct the commands to) for the received commands (i.e., disambiguates the command). If the local device determines that itself is the target device, it processes (or responds to) the commands accordingly, otherwise, it relays (or passes) the commands to the intended remote device in any manner.

In one embodiment, the local device includes a remote key router module (hereinafter called a RKR module) 231. The RKR module 231 includes any sort of hardware and/or software features that are configured to determine a target device for commands received and to route (or relay or pass) the commands to the target device (if different from the local device). The RKR module 231 has access to key mapping information, which includes keys acceptable by the local device and by remote devices connected with the local device. Key mapping data may be stored in a lookup table or other logical structure within control logic 205 and/or elsewhere within the local device, as described more fully below. In various embodiments, the RKR module 231 is implemented as a software module or routine that executes on a processor residing within the local device (e.g., media device 110 in FIG. 1). In such embodiments, RKR module is able to receive inputs from remote 160, to identify which inputs are processed locally, and to distribute the inputs (e.g., in the form of internal or externally-routed signals) for appropriate processing. If the received input is intended for a remote device (e.g., placeshifting device 130), a signal may be sent (e.g., over a network or other data communications link) to the remote device for remote processing. Other embodiments may vary, however, as appropriate.

In one embodiment, each device (local or remote) is represented by an agent application 233A-C running in the local device. The agent application 233 includes hardware and/or software features that are configured to route data (e.g., commands and/or content) between the represented device and the RKR module. The RKR module can therefore communicate with the devices through the agent applications 233, rather than communicating with the devices directly. In an exemplary embodiment, RKR module 231 and any agent applications 233 are applets, programs or other modules executing as part of control logic 205 (FIG. 1B), although other embodiments may implement these features in any other manner.

Figure 8:
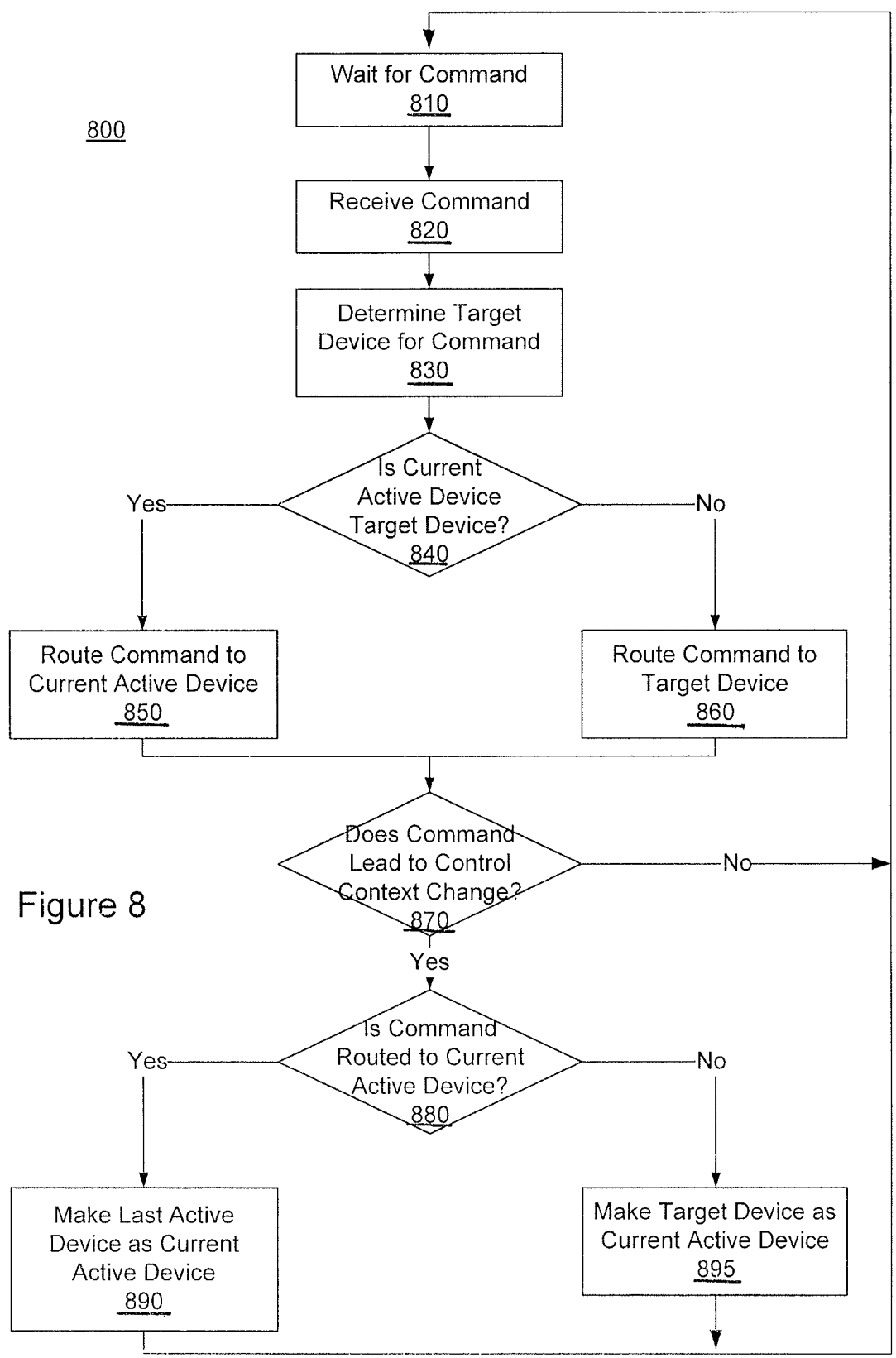
FIG. 8 is a flowchart diagram illustrating an exemplary method to disambiguate commands received at a media device.

FIG. 8 illustrates a flow diagram of a method 800 for a local device to disambiguate received commands and route them to an intended target device. Method 800 may be implemented in hardware, software and/or firmware (e.g., as part of control logic 205). To that end, method 800 may be implemented in any sort of source and/or object code in any format, which may be stored in any digital storage medium (e.g., memory, firmware or mass storage associated with device 110) and may be executed on any processor, including any processor residing within media device 110. Other embodiments may include additional steps to those shown in FIG. 8, may omit certain steps, or may arrange the various steps that are present in any other temporal or logical manner as desired.

Referring now to the embodiment shown in FIG. 8, agent applications 233 are instantiated (or created) in the local device to represent the local device and the connected remote devices. In various embodiments, these applications are initiated in control logic 205 shown in FIG. 1B, although other embodiments may operate in any other manner. Typically, the agent applications 233 register key mapping information for the represented device (e.g., keys acceptable by the represented device) in the RKR module 231. Agent applications may be instantiated at system startup, upon initial contact from the remote device, and/or on any other basis.

The RKR module 231 initially waits 810 for commands from associated input devices (e.g., a remote control) as appropriate. After receiving 820 a command (e.g., a remote control key) from an input device, the RKR module 231 determines 830 target device(s) for the command. In one embodiment, the RKR module 231 checks key mapping information to identify device(s) accepting the received command and determine 830 the device(s) as target device(s).

The RKR module 231 determines 840 whether the current active device is a target device. The current active device is any device with which the user is actively engaged. For example, if the user is operating (or watching) video streamed from a source (e.g., a place-shifting device 130) then the current active device will typically be the place-shifting device 130. The current active device can be the local device or a remote device. By default, the local device may be initially considered as the current active device (although other embodiments may assume that a remote device is initially the current active device). The current active device information may be stored together with the key mapping information or elsewhere as desired.

If the RKR module 231 determines 840 that the current active device is a target device, then the RKR module 231 routes 850 the command to an agent application 233A-C representing the current active device. In one embodiment, even if there are target devices other than the current active device, the RKR module routes the command to the current active device. The current active device is the device that the user is actively engaged with. Therefore, the user probably intends the received command for the current active device.

If the RKR module 231 determines 840 that the current active device is not a target device, then the RKR module routes 860 the command to an agent application 233 representing a target device. In one embodiment, if there are multiple target devices, the RKR module routes 860 the command to a target device with a highest priority. The agent 233, then, transmits the appropriate instruction to the remote device over the network or other link to produce the effect desired by the viewer. As shown in FIG. 2A, for example, a command received at RF receiver 207 from remote 160 may be processed at RKR module 231 and forwarded to an agent module 233A that is associated with a remote component (e.g., place-shifting device 130). Agent 233A contains logic and information sufficient to forward the instruction intended by the viewer to the remote device; in practice, this instruction may be sent from control logic 205 (e.g., using conventional I/O techniques) to network interface 210 for transmission to remote device 130 over the network. One example of a method to determine priority for devices is described in greater detail below.

The RKR module 231 (and/or one or more agent applications 233) also determines 870 whether the received command leads to control context change. In one embodiment, one or more commands (or keys) may be configured to indicate an intention to switch control context. For example, the user may press a menu button (or option button) while operating a remote device (e.g., a place-shifting device) to indicate a control context shift and to trigger the local device to display its menu. In another embodiment, depends on user configuration, a command not supported by the current active is considered to lead to control context change to the target device. In yet another embodiment, if the RKR module 231 receives a command that previously led to the most recent control context change, the RKR module 231 determines that the command leads to control context change, and restores previous control context by making the last active device as the current active device.

If it is determined 870 that the command does not lead to control context change, the RKR module 231 waits 810 for the next command. Otherwise, the RKR module 231 determines 880 whether the command is routed 850 to the current active device. If the command is routed 850 to the current active device, it may be determined that the user wants to resume previous engagement with the last active device. Therefore, the RKR module 231 makes 890 the last active device as the current active device. In one embodiment, the agent application of the current active device (or the RKR module 231) determines that the received command is for the last active device, and forwards (or passes) the command to its agent application.

If the command is routed 860 to a target device that is not the current active device, it is determined that the user intends to start engaging with the target device. Therefore, the RKR module 231 makes 895 the target device as the new current active device, and the previous current active device now becomes the last active device. After switching control context, the RKR module 231 resumes waiting 810 for the next command.

The following examples illustrate the method 800 in a place-shifting context. In these examples, the place-shifting device 130 (the remote device) streams video content to the media device 110 (the local device). Users may use the remote control 160 to control the media device 110 of the place-shifting device 130 through the media device. Other embodiments may apply the concepts and techniques described in this example, however, to control any number of other components. Indeed, a single media device could control multiple other devices in various embodiments. Further, a "controlled" device may itself control other devices. A place-shifting device 130, for example, may itself control a DVR 180, DVD player 170, receiver 175 and/or any other device using the techniques described herein, or using an infrared or other wireless "blaster" type device that emulates signals transmitted by a remote control associated with the device. As an example, an instruction transmitted by remote 160 may be received at media device 110, transmitted over a network or other link to a placeshifting device 130, and then relayed via an RF emulator from device 130 to DVR 180, which may itself control receiver 175. Many different scenarios could be formulated across a wide array of equivalent embodiments.

The table below illustrates key mapping information for an exemplary media device 110 and an exemplary place-shifting device 130 used in the following example; other embodiments may use different key mapping information as appropriate.

TABLE 1

| Remote Key | Media Device (Local Device) | Place-shifting Device (Remote Device) |
|---|---|---|
| Menu | Yes | No |
| Left | Yes | Yes |
| Right | Yes | Yes |
| Up | Yes | Yes |
| Down | Yes | Yes |
| Option | Yes | Yes |
| Channel Up | No | Yes |
| Channel Down | No | Yes |
| Play | Yes | Yes |
| Guide | No | Yes |

As illustrated, the remote control 160 has the following ten keys: a Menu key, four direction keys (Left, Right, Up, and Down), an Option key, two channel keys (Channel Up and Channel Down), a Play key, and a Guide key. The media device 110 accepts (or supports or handles) seven of the ten keys (Menu, Left, Right, Up, Down, Option, and Play). The place-shifting device 130 accepts nine of the ten keys (Left, Right, Up, Down, Option, Channel Up, Channel Down, Play, and Guide) in this example.

For example, assume a user is operating the local media device 110. The user presses the Menu key on the remote control 160. The RKR module 231 on the media device 110 receives 820 a signal indicating this user action. Because the Menu key is accepted by a single device, the media device 110, the RKR module 231 determines 830 that it is the target device and routes 850 the Menu key command to the media device 110. The RKR module 231 determines 870 that the Menu key command does not lead to control context change, and the local media device 110 remains as the current active device.

As another example, assume the user is actively operating the remote placeshifting device 130. The RKR module 231 receives 820 a signal indicating the user pressed the Play key on the remote control 160. Both the local media device 110 and the remote place-shifting device 130 accept the Play key, so the "play" input is at least potentially ambiguous. However, because the place-shifting device 130 is the current active device, the RKR module 231 determines 830 that the placeshifting device 130 is the target device and routes 850 the Play key command to the place-shifting device 130. The RKR module 231 in this embodiment determines 870 that the Play key command does not lead to control context change, and the remote place-shifting device 130 remains as the current active device.

As an example of control context change, assume the user is watching video streamed from the place-shifting device 130 through the media device 110 on the display 120. In this context, commands from the remote control 160 are normally related to the place-shifting device 130 (e.g., pause, fast forward). Therefore, the RKR module 231 deems the place-shifting device 130 as the current active device.

As the user presses the Menu key, the RKR module 231 receives 820 a corresponding command from the remote control 160. The RKR module 231 checks key mapping and determines 830 that the local media device 110 is the target device because it is the only device accepting the Menu key. The RKR module 231 determines 840 that the current active device, the place-shifting device 130, is not a target device and routes 360 the Menu key command to the media device 110.

The RKR module 231 determines 870 that the Menu key command leads to a control context change, and determines 880 that the Menu key command is not routed to the current active device. Therefore, the RKR module 231 makes 895 the target device, the local media device 110, as the current active device, and routes subsequent commands to it, unless and/or until receiving a command that leads to control context change (e.g., the user presses the Menu key again or presses a key only accepted by the place-shifting device 130). Therefore, when this control context switch happens, the user can navigate the user interface of the media device 110 using the remote control 160.

In one embodiment, the RKR module 231 determines a priority for each device and routes commands based on priority. For example, the RKR module 231 may route a received command to a device accepting the command and having the highest priority. The priorities may be determined based on factors such as how frequently and/or how recent the user interacts with the devices. The priority may also be predetermined or assigned by the user.

In one embodiment, users may program soft-keys on the remote control by assigning commands intended for the local device and/or a remote device to the programmable soft-keys as desired. Subsequently, when the user presses these programmed soft-keys, the RKR module 231 automatically sets the control context to be for the local device or the remote device and acts accordingly.

By implementing the method in the local device, a user may control remote devices connected with the local device and the local device through a single control device without specifying the intended target. Therefore, the disclosure provides a non-interruptive method for a user to control multiple devices.

What is claimed is:

1. A method executable by a local device to process an input received at the local device from a user via a remote control, the method comprising:
   receiving a media stream at the local device from a remote device via a network;
   presenting the media stream on a display associated with the local device as the media stream is received via the network, wherein the media stream is presented with an interface feature having a first plurality of options, and wherein the presentation of the media stream is shrunken to occupy less than a full screen of the display so that a periphery extends from the presentation of the media stream to an edge of the display, and so that the first plurality of options is spatially arranged on the periphery so as to not obscure the presentation of the media stream;
   receiving a directional input having a direction corresponding to a direction from the presentation of the media stream toward one of the first plurality of input options spatially arranged on the periphery;
   in response to the directional input, presenting second imagery on the display, wherein the second imagery comprises a second plurality of input options that is presented adjacent to the presentation of the media stream on the display in a direction from the presentation of the media stream that corresponds to the direction of the directional input;
   receiving the input from the remote control at the local device associated with the display, wherein the input indicates one of the second plurality of options;
   determining if the input is intended for the local device or the remote device that provides the media stream;
   if the input is intended for the local device, processing the input at the local device; and
   if the input is intended for the remote device, transmitting a signal from the local device to the remote device via the network to thereby allow the remote device to respond to the input.

2. The method of claim 1 wherein the remote device is a placeshifting device that provides the media stream to the local device via the network, and wherein the transmitting comprises transmitting the signal from the local device to the placeshifting device to thereby change the media stream provided by the placeshifting device.

3. The method of claim 1 wherein the transmitting comprises transmitting the signal over the network to the remote device to thereby adjust the media stream.

4. The method of claim 1 wherein the input is a wireless input.

5. The method of claim 1 wherein the determining comprises recognizing that the input is able to be processed by one of the local device and the remote device, but not by the other.

6. The method of claim 5 further comprising establishing the one of the local device and the remote device that is able to process the input as a current active device.

7. The method of claim 6 further comprising routing subsequent inputs received from the remote control to the current active device.

8. The method of claim 7 wherein the subsequent inputs are routed until a subsequent input is received that is not able to be processed by the current active device.

9. The method of claim 1 wherein the processing of the input at the local device comprises displaying an interface for further inputs on the display.

10. The method of claim 9 wherein the interface is presented on the display along with the media stream.

11. The method of claim 10 wherein the interface comprises a plurality of input options arranged about a periphery of a presentation of the media stream on the display.

12. The method of claim 11 wherein the user is able to select one of the plurality of input options by providing the input on the remote control, and wherein the input comprises a direction.

13. The method of claim 12 further comprising displaying a second interface in response to the user selection of one of the plurality of input options, wherein the second interface comprises a second plurality of input options.

14. The method of claim 13 wherein the second interface is presented adjacent to a presentation of the media stream on the display in a direction that corresponds to the direction of the input.

15. A local system for processing an input received via a remote control from a viewer of a display, the system comprising:
- a wireless receiver configured to receive the input from the remote control;
- a network interface configured to be coupled to a network;
- a display interface configured to be coupled to the display; and
- a processor configured to receive the input from the wireless receiver, to receive a media stream from a remote device via the network interface, to present imagery comprising the media stream on the display via the display interface, to process the input at the local system if the input is intended for the local system, and to transmit a signal to the remote device via the network to thereby allow the remote device to respond to the input if the input is intended for the remote device, wherein the presentation of the media stream within the imagery is shrunken to occupy less than a full screen of the display so that a periphery extends from the presentation of the media stream to an edge of the display, and so that the first plurality of options is spatially arranged on the periphery so as to not obscure the presentation of the media stream, and wherein the processor is further configured to receive a directional input having a direction corresponding to a direction from the presentation of the media stream toward one of the first plurality of input options spatially arranged on the periphery, and, in response to the directional input, to present second imagery on the display, wherein the second imagery comprises a second plurality of input options that is presented adjacent to the presentation of the media stream on the display in a direction from the presentation of the media stream that corresponds to the direction of the directional input, and wherein the input indicates one of the second plurality of options.

16. The system of claim 15 wherein the system comprises a remote key router module configured to determine whether the input is intended for the local system or the remote device.

17. The system of claim 16 wherein the system further comprises an agent application associated with the remote device, and wherein the remote key router module is further configured to route the input to the agent application associated with the remote device if the input is intended for the remote device.

18. The system of claim 17 wherein the agent application associated with the remote device is configured to transmit the signal to the remote device via the network interface.

19. The system of claim 15 wherein the remote device is a placeshifting device.

20. A method of processing an input received from a user via a remote control, the method comprising:
- presenting first imagery on a display, wherein the first imagery comprises a presentation of a media stream having a periphery and an interface feature comprising a first plurality of input options, and wherein the presentation of the media stream is shrunken to occupy less than the full screen so that the periphery extends from the presentation of the media stream to the edge of the screen, and so that the first plurality of input options is spatially arranged on the periphery of the presentation of the media stream on the display so as to not obscure the presentation of the media stream;
- receiving the input from the remote control at a local device associated with the display, wherein the input is a directional input having a direction corresponding to a direction from the presentation of the media stream toward one of the first plurality of input options spatially arranged on the periphery; and
- in response to the directional input, presenting second imagery on the display, wherein the second imagery comprises a second plurality of input options that is presented adjacent to the presentation of the media stream on the display in a direction from the presentation of the media stream that corresponds to the direction of the input.

* * * * *